United States Patent
Dao et al.

(10) Patent No.: US 10,367,239 B1
(45) Date of Patent: Jul. 30, 2019

(54) INTEGRAL BATTERY TEMPERATURE CONTROL SYSTEM

(71) Applicant: Elite Power Solutions LLC, Chandler, AZ (US)

(72) Inventors: Yuan Dao, Chandler, AZ (US); William Jeffrey Schlanger, Flagstaff, AZ (US)

(73) Assignee: Elite Power Holdings LLC, Las Vegas, NV (US)

(*) Notice: Subject to any disclaimer, the term of this patent is extended or adjusted under 35 U.S.C. 154(b) by 155 days.

(21) Appl. No.: 15/619,357

(22) Filed: Jun. 9, 2017

Related U.S. Application Data

(63) Continuation-in-part of application No. 14/657,972, filed on Mar. 13, 2015, now abandoned, which is a continuation-in-part of application No. 13/077,136, filed on Mar. 31, 2011, now Pat. No. 9,000,935.

(51) Int. Cl.
| | |
|---|---|
| *H01M 10/633* | (2014.01) |
| *H01M 10/48* | (2006.01) |
| *H01M 2/10* | (2006.01) |
| *H01M 10/6571* | (2014.01) |
| *H01M 10/625* | (2014.01) |
| *H01M 10/615* | (2014.01) |
| H01M 10/42 | (2006.01) |

(52) U.S. Cl.
CPC ....... *H01M 10/633* (2015.04); *H01M 2/1077* (2013.01); *H01M 10/486* (2013.01); *H01M 10/615* (2015.04); *H01M 10/625* (2015.04); *H01M 10/6571* (2015.04); *H01M 2010/4271* (2013.01); *H01M 2220/20* (2013.01)

(58) Field of Classification Search
CPC ... H01M 10/633; H01M 10/60; H01M 10/615
USPC ........ 320/112, 132, 134-136, 150, 153-154, 320/162-164
See application file for complete search history.

(56) References Cited

U.S. PATENT DOCUMENTS

| | | | |
|---|---|---|---|
| 5,532,083 A | * | 7/1996 | McCullough ............ H01B 1/04 252/502 |
| 5,853,908 A | | 12/1998 | Okutoh |
| 6,002,240 A | | 12/1999 | McMahan |
| 6,271,643 B1 | | 8/2001 | Beacker et al. |
| 7,330,013 B2 | | 2/2008 | Wolin et al. |

(Continued)

*Primary Examiner* — Richard V Muralidar
(74) *Attorney, Agent, or Firm* — Invention to Patent Services; Alex Hobson

(57) ABSTRACT

An integral battery temperature control system monitors and heats a battery to enable operation in cold environments and utilizes a heating device coupled to one of the terminals of the battery to heat the terminal and thereby heat the electrode coupled thereto. The heated electrode is within the battery housing and internally heats the battery. A temperature sensor measures the temperature of the opposing terminal and a controller will terminate heating when the measured temperature of the opposing terminal rises above an upper threshold temperature value. The heating device be coupled with or be part of a discharge circuit, wherein electrical current from the battery is used to heat the battery. A discharge circuit is part of a battery unit monitoring module that balances the voltage of a plurality of battery units. The heating device may include a resistor or a transistor of the discharge circuit.

20 Claims, 24 Drawing Sheets

(56) References Cited

U.S. PATENT DOCUMENTS

| | | |
|---|---|---|
| 7,446,508 B2 | 11/2008 | Aradachi et al. |
| 7,948,212 B2 | 5/2011 | Odaohhara |
| 8,058,846 B2 | 11/2011 | Kim |
| 8,093,862 B2 | 1/2012 | Mariels |
| 8,164,310 B2 | 4/2012 | Takeuchi et al. |
| 8,395,356 B2 | 3/2013 | Schaefer et al. |
| 9,397,516 B2 | 7/2016 | Hunter et al. |
| 9,509,152 B2 | 11/2016 | Peh et al. |
| 2012/0188714 A1* | 7/2012 | Von Borck .......... H01M 2/1061 361/688 |
| 2013/0093399 A1 | 4/2013 | Svensson et al. |
| 2016/0181845 A1* | 6/2016 | Resnick ................ H02J 7/0063 320/136 |

\* cited by examiner

Output Turns on With Alarm

Output Turns off With Alarm

INTEGRAL BATTERY TEMPERATURE CONTROL SYSTEM

CROSS REFERENCE TO RELATED APPLICATIONS

This application is a continuation in part of U.S. patent application Ser. No. 14/657,972 filed on Mar. 13, 2015 and currently pending, which is a continuation in part of U.S. patent application Ser. No. 13/077,136, filed on Mar. 31, 2011 and issued as U.S. Pat. No. 9,000,935 on Apr. 7, 2015, the entirety of both applications are hereby incorporated by reference herein.

BACKGROUND OF THE INVENTION

Field of the Invention

The invention is directed to a battery temperature control system comprising a battery temperature monitor and a heating system, and particularly to a heating system that is integral with a battery management system.

Background

Lithium batteries do not effectively accept a charge when below about 0° C. and cannot effectively discharged when below −20 C. These temperatures can vary however based on the type of use. When lithium batteries are used in cold temperature environments, insulated enclosures are sometimes utilized along with auxiliary heaters. These measures require addition volume around the batteries and/or an auxiliary power source.

Current battery management systems obtain data about individual battery units in a battery system. The systems reserve addresses for communication with battery unit sensors and/or battery units. When sensors transmit data about battery units to the management system, the sensors include the address of the battery unit. Such a system may require significant amounts or resources and complex arrangements for connecting the components of the system.

As shown in FIG. 19, lithium batteries have a non-linear discharge profile, with a relatively flat discharge region up to about 80% discharged. Therefore, a small change in voltage can mean a large difference in the state of charge, unlike a lead acid battery that has a relatively linear drop in voltage as the battery is discharged. The state of charge of a lead acid battery, and therefore the amount of power remaining, is more easily monitored by a UPS system by simply monitoring the voltage of the lead acid battery. The amount of power remaining in a lithium battery system is more difficult to monitor and predict however by simply measuring voltage. It would therefore be more difficult to determine the available power remaining in a lithium battery unit by simply measuring the voltage.

Current charging systems are configured to charge a battery pack to a predetermined voltage. However, the individual battery may not be charged to the same level, and the discrepancy between the batteries state of charge levels can cause capacity to be limited. The battery pack capacity is limited to the capacity of the lowest battery unit. Additionally, when some battery units have lower state-of-charge levels, as the battery discharges, those units may discharge to a level resulting in permanent loss of charging capacity.

SUMMARY OF THE INVENTION

The invention is directed to a battery temperature detection and heating system and particularly to a heating system that is integral with a battery management system. An exemplary battery heating system has a heating device that is coupled to a terminal of a battery and a temperature sensor that is coupled to the opposing terminal. Heat is conduct from the terminal through an electrode within the battery housing to heat the battery internally, while the battery temperature is measured on the opposing terminal. When a battery drops below a lower threshold temperature value a discharge circuit, which may be part of the battery management system and incorporated with the battery unit monitoring module, may be activated to flow current to a heating device, such as an electrically resistive heater or a transistor. When the temperature rises above an upper threshold temperature value, the flow of current through the discharge circuit may be terminated by a controller. A discharge circuit flows current between the terminals of a battery to reduce the voltage of the battery and bring to a voltage that is closer to the other batteries in the battery unit or pack.

The control system may turn on the battery heating circuit when a temperature sensor measures a temperature of the battery that is below a lower threshold temperature value and in some cases only when the state of charge of the battery is above a threshold value to prevent discharging the battery and further reducing the battery voltage. In addition, the battery heating circuit may be turned-off by the controller if while activated, the voltage of the battery drops below a lower threshold value; again, to prevent further reduction of the battery voltage by a draw of current to the heater. In still another embodiment, the battery heater may have a time limit, wherein the battery heater is activated for a period of time and then shuts off. A battery heater circuit may have a user override, or a means to prevent the battery heater from being activated, such as a manual switch, or a selection that is input to the controller, such as through a user interface.

In an exemplary embodiment, a battery management system, comprises a program to determine the state of charge of a battery unit or battery, or the amount of available charge remaining. The calculation takes into account the battery unit or pack voltage prior to the utilization of battery power as the output power. The program utilizes input related to the power being drawn by the powered device, such as current, voltage and time, and calculates the total power usurped from the battery pack. The program can then calculate the discharge percent of the battery pack, as depicted in FIG. 19. A power control system may calculate the time remaining before the battery pack is discharged 80% and may send an alert via a data transmission system of the remaining time before shut-down. A power control system may shut-down the battery pack if a discharge level of 80% or more is reached, for example, in an effort to protect the system and prevent damage to the battery pack.

An exemplary battery unit may comprise a plurality of cell units comprising a positive electrode separated from a negative electrode by a separator. Each cell unit creates electrical current and are configured in an electrolyte. In an exemplary embodiment, the cell units are planar, wherein the electrodes are planar having a first side and a second side. A positive electrode may be configured between two separators and two negative electrodes on opposing sides of the positive electrode to produce a dual cell unit. A dual cell unit has one electrode configured between two opposing electrodes. This alternating configuration of positive and negative electrodes enables just one of the electrodes, that is heated, to transfer heat to the opposing electrodes quickly and effectively. For example, the positive terminal may be heated by a heating device and each of the planar positive electrodes may conduct heat thereby distributing the heat within the cell. Since the positive electrodes are sandwiched between negative electrodes, heat will be quickly conducted throughout the cell. As the negative electrodes rise in temperature, the temperature sensor coupled with the negative electrode will communicate the temperature measured to a controller. When the temperature rises above an upper threshold temperature, the current flow to the heating device may be terminated. The lower threshold temperature value may be above a temperature when a battery will not effectively charge or discharge, such as above 0° C., or above −20° C., for example. In an exemplary embodiment, the lower threshold temperature value is about 0° C. or more, or about 5° C. or more, about 10° C. or more, about 10° C. or less, about 5° C. or less and any temperature between and including the values provided. The battery may be heated until the temperature of the terminal or terminal connector opposite the terminal that is heated, reaches an upper temperature threshold value. This upper temperature threshold value may be higher than the lower temperature threshold limit to prevent the heating circuit from turning on and off frequently in cold environments. An upper temperature threshold value may be greater than the lower temperature threshold limit by about 5° C. or more, about 10° C. or more for example.

A heating device may be coupled directly with a terminal of the battery or to a portion of an electrode, or electrode connector, wherein heat is conducted to the electrode within the battery housing. The electrode acts as an internal heating element, wherein the electrode is within the battery housing and heats the battery from the inside. An electrode connector may electrically connect an electrode with a terminal, and may extend between a plurality of planar electrodes, as shown and described herein. A heating device may be a discharge circuit that is utilized by a battery unit monitoring module and/or battery management system to regulate the state of charge of a battery. In some cases, when a plurality of batteries are employed in a battery system, it may be important to keep the state of charge of each battery within some range of the other batteries, thereby preventing overcharging or over-discharging one of the batteries. A discharge circuit may be used to discharge a battery to reduce a state of charge and bring the state of charge of the battery down to within an acceptable range of the other batteries.

An exemplary battery management system includes a battery unit monitoring module that is utilized for obtaining data about battery units in a battery pack. A computing device can obtain the data by sending a data request to the first monitoring module. The first monitoring module obtains and transmits data about its connected battery unit to the computing device and sends a data request to the second monitoring module. The second monitoring module obtains and transmits data about its connected battery to the computing device and sends a data request to the next monitoring module. Each successive monitoring module performs the same steps until all the monitoring modules have sent data about their connected battery units to the computing device. Thus, the computing device needs solely a data request port and input data port(s) to obtain the data for a battery pack.

In one aspect, the present disclosure describes a battery management system. The battery management system includes a computing device with an output data request port and an input data port. The battery management system also includes first and second battery unit monitoring modules, each battery unit monitoring module connected to the input data port of the computing device. In response to a data request from the output data request port of the computing device, the first battery unit monitoring module transmits data of the first battery unit to the input data port of the computing device, and transmits a data request to the second battery unit monitoring module. In response to the data request from the first battery unit monitoring module, the second battery unit monitoring module transmits data of the second battery unit to the input data port of the computing device.

The first battery unit monitoring module can connect to a first battery unit in a battery pack of an electric vehicle. The battery management system can also include wiring connecting the computing device to the battery unit monitoring modules. Because the battery units in a battery pack can be wired in series, the physical locations of the positive and negative terminals arranged in an alternating fashion, the second battery unit monitoring module is oriented in an opposite direction from the first battery unit monitoring module.

The first battery unit monitoring module can include an analog-to-digital converter. The analog-to-digital converter can measure a voltage of the first battery unit. The first battery unit monitoring module can include a temperature monitoring device that measures a temperature of the first battery unit. The temperature can be expressed as a voltage which is applied to an input of the analog-to-digital converter. Data of the first battery unit can be a voltage and a temperature of the first battery unit. Data of the second battery unit can be a voltage and a temperature of the second battery unit.

The computing device can scan the first and second battery unit monitoring modules to determine a number of battery unit monitoring modules in the battery management system. The computing device can transmit a second data request to the first battery unit monitoring module after the computing device has not received data on the input data port for a predetermined period of time. The predetermined period of time may be 20 ms. The computing device can include an analog-to-digital convertor that measures a voltage across the first and second battery units. The computing device can include an analog-to-digital convertor that measures a current flowing in the first and second battery units.

The computing device can output an alarm when an error condition is detected. The error condition can be a high voltage condition, a low voltage condition, a high current condition, a high temperature condition, or a connection fault condition. The computing device can shut off a battery charger when the computing device detects a high voltage condition across the first and second battery units. The computing device can shut off a motor controller when the computing device detects a low voltage condition across the first and second battery units.

The battery management system can include a monitor, such as a video monitor, that displays the data of the first and second battery units. The battery management system can include a connection fault detector that detects a connection between a node at a zero-voltage reference level and the first and second battery units. The battery management system can include one or more battery unit balancing systems, each system balancing charge in a battery unit.

In another aspect, the present disclosure describes a battery management system with a computing device and first and second battery unit monitoring modules. The computing device includes a first output data request port and an input data port. The first battery unit monitoring module includes a first input data request port connected to the output data request port of the controller, a first output data port connected to the input data port of the controller, and a second output data request port. The second battery unit monitoring module includes a second input data request port connected to the second output data request port of the first battery unit monitoring module, and a second output data port connected to the input data port of the controller.

In another aspect, the present disclosure describes a method of managing a battery. The method includes transmitting, by a computing device, a first data request to a first battery unit monitoring module. The method also includes transmitting, by the first battery unit monitoring module, data of a first battery unit to an input data port of the computing device in response to the first data request. The method also includes transmitting, by the first battery unit monitoring module, a second data request to a second battery unit monitoring module. The method also includes transmitting, by the second battery unit monitoring module, data of a second battery unit to the input data port of the computing device in response to the second data request.

The entirety of the following patents are incorporated by reference herein: U.S. Pat. No. 8,723,482 issued on May 13, 2014 and entitled Battery Unit Balancing System; U.S. Pat. No. 9,595,847, issued on Mar. 14, 2017 and entitled Uninterrupted Lithium Battery Power Supply System; U.S. Pat. No. 9,371,067, issued on Jun. 21, 2016 and entitled Integrated Battery Control System; and U.S. Pat. No. 9,553,460, issued on Jan. 24, 2017 and entitled Wireless Battery Management System; all are assigned to Elite Power Solutions LLC.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS THE DRAWINGS

The accompanying drawings are included to provide a further understanding of the invention and are incorporated in and constitute a part of this specification, illustrate embodiments of the invention, and together with the description serve to explain the principles of the invention.

Figure 1:
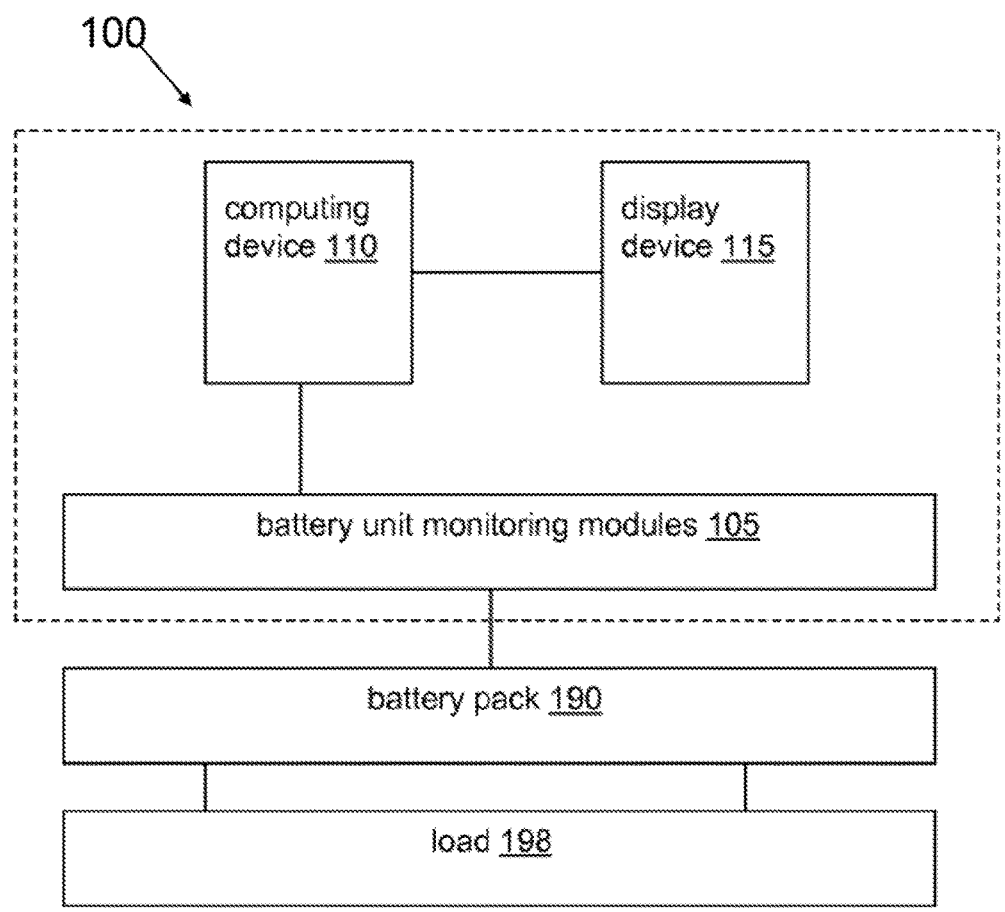
FIG. 1 is a block diagram depicting an exemplary embodiment of a battery management system connected to a battery pack.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

The present disclosure describes, among other things, certain embodiments of a battery management system. The management system obtains and displays data about battery units in a battery pack. The management system can monitor the voltage and temperature of the individual battery units and/or the entire battery pack. If the management system discovers any of the battery units pose a concern (e.g., the voltage is over or under limits, or the battery unit is overheating), the system can take measures to prevent damage to itself or the battery pack or to alleviate the concern. The system can also take comparable measures if the system detects a connection between any of the battery units and ground. Thus, the battery management system can maintain the consistent operation of the system the battery pack powers, such as an electric vehicle.

Referring now to FIG. 1, a block diagram of an exemplary embodiment of a battery management system 100 connected to a battery pack 190 is shown and described. The battery management system 100 includes battery unit monitoring modules 105 (e.g., sense boards), a computing device 110, and a display 115 (e.g. a monitor such as an LCD monitor or a monitor incorporated into another device, such as a DVD player). The computing device 110 can measure voltage and/or current for the entire battery pack 190 and output the data to the display 115. In various embodiments, the computing device 110 can determine the state of charge of the battery pack 190 by measuring the amount of current that flows in or out of the battery pack 190. The battery pack 190 can integrate the amount of current to determine the state of charge. In some embodiments, when the battery pack 190 reaches a minimum, predetermined voltage, the computing device 110 can set the pack's 190 state of charge to about 0%. When the battery pack 190 reaches a maximum, predetermined voltage, the computing device 110 can set the state of charge to about 100%.

In some embodiments, the battery pack 190 may Include a plurality of battery units 195 (e.g., battery cells). Each battery unit may include a battery cell or a plurality of battery cells. The battery pack 190 can connect to an external load 198, such as a motor for an electric vehicle. Each battery unit monitoring modules 105 of the management system 100 can connect to a battery unit 195. A monitoring module 105 can obtain data, such as voltage and/or temperature, for the battery unit 195 connected to the module 105. The monitoring modules 105 can transmit the data to the computing device 110, which can output the data to the display 115.

In some embodiments, the computing device 110 may be configured to operate with a predetermined, fixed number of battery unit monitoring modules 105. In some embodiments, the computing device 110 may be configured to scan the modules 105 to determine the number of modules 105 present. The computing device 110 can scan the battery unit monitoring modules 105 to determine the number of monitoring modules 105 in the system 100. For example, in some embodiments, the computing device 110 can output a scan signal to the first monitoring module 105. In response, the monitoring module 105 can return battery unit voltage and temperature data to the computing device 110 and can output a scan signal to a successive monitoring module 105. In some embodiments, the monitoring module 105 can also return battery unit voltage and temperature data to the computing device 110, and can output a scan signal to the next module 105. Thus, the computing device 110 can count the number of monitoring modules 105 by the number of voltage and temperature data packets received. Further, the computing device 110 can number a monitoring module 105 and/or battery unit 195 based on the module's 105 or unit's 195 position in the order of scan signals received. In some embodiments, a user can configure the computing device 110 to set the number of monitoring modules 105 or to instruct the device 110 to scan the modules 105 and obtain the number of modules itself.

The computing device 110 can detect error conditions for individual battery units 195 and/or the entire battery pack 190. Exemplary error conditions can include conditions such as high voltage conditions, low voltage conditions, high current conditions, and high temperature condition. Another exemplary error can be a connection fault condition, e.g., a connection between at least one battery unit 195 and a contact point with a zero-voltage reference level, such as a chassis of an electric vehicle.

When an error is detected, the computing device 110 can initiate a measure based on the error condition. For example, if the computing device 110 detects a high voltage condition for the entire battery pack 190, the computing device 110 can inactivate a device that charges the pack 190 (not shown). In another example, if the computing device 110 detects a first low voltage condition, the computing device 110 can output a low voltage warning to the display 115. If the battery pack's 190 voltage drops further, triggering a second low voltage condition, the device 110 can inactivate a load connected to the battery pack 190, such as a motor controller of an electric vehicle.

Figure 2:
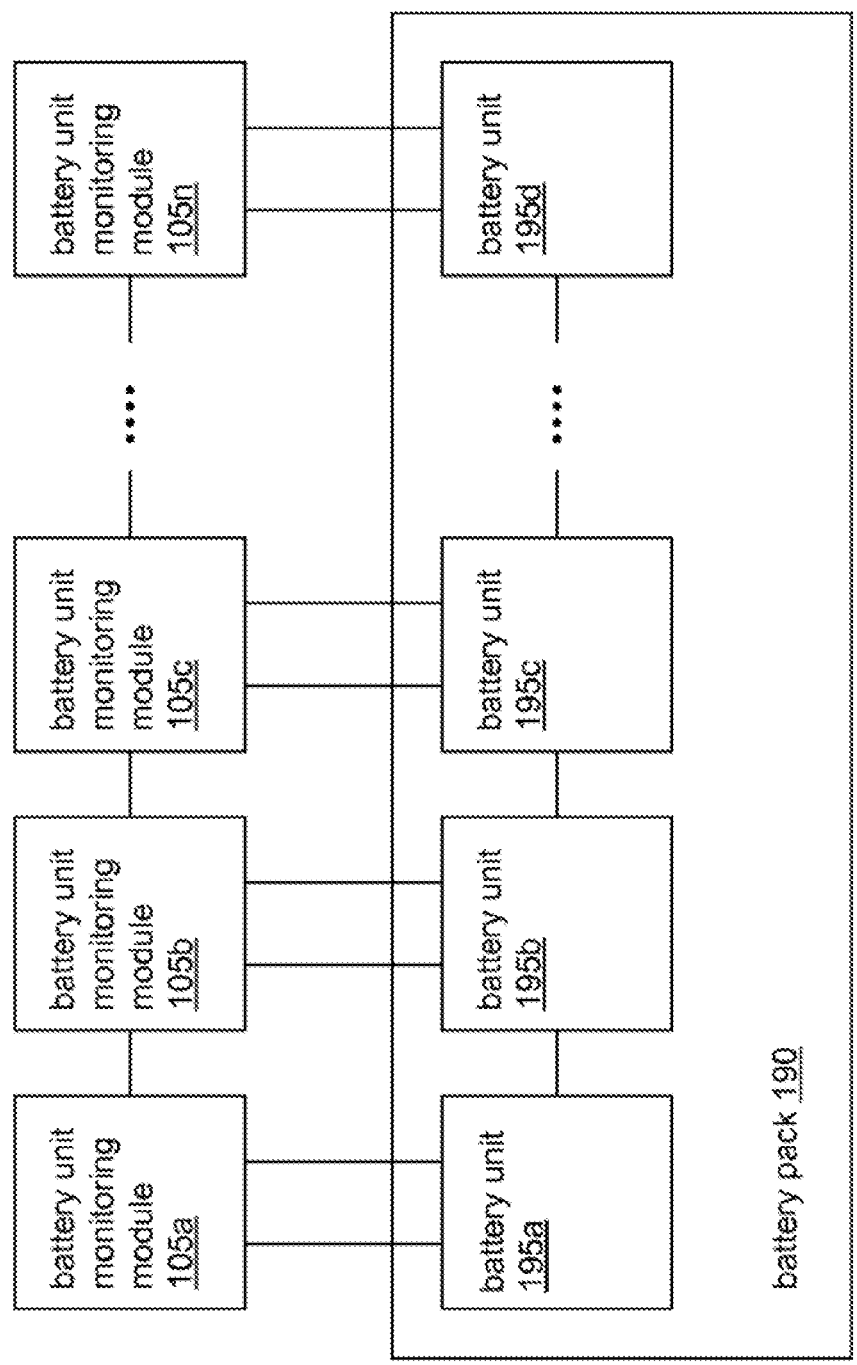
FIG. 2 is a block diagram depicting an exemplary arrangement of battery unit monitoring modules of the battery management system with respect to the battery units of the battery pack.

Referring now to FIG. 2, a block diagram of an exemplary arrangement of battery unit monitoring modules 105 and battery units 195 in a pack 190 is shown and described. In this embodiment, the monitoring modules 105 are connected to the battery units 195, which are connected in series. Each monitoring module 105 can be connected to a single battery unit 195. The battery unit 195 can supply the connected monitoring module 105 with power for performing its operations.

Figure 3:
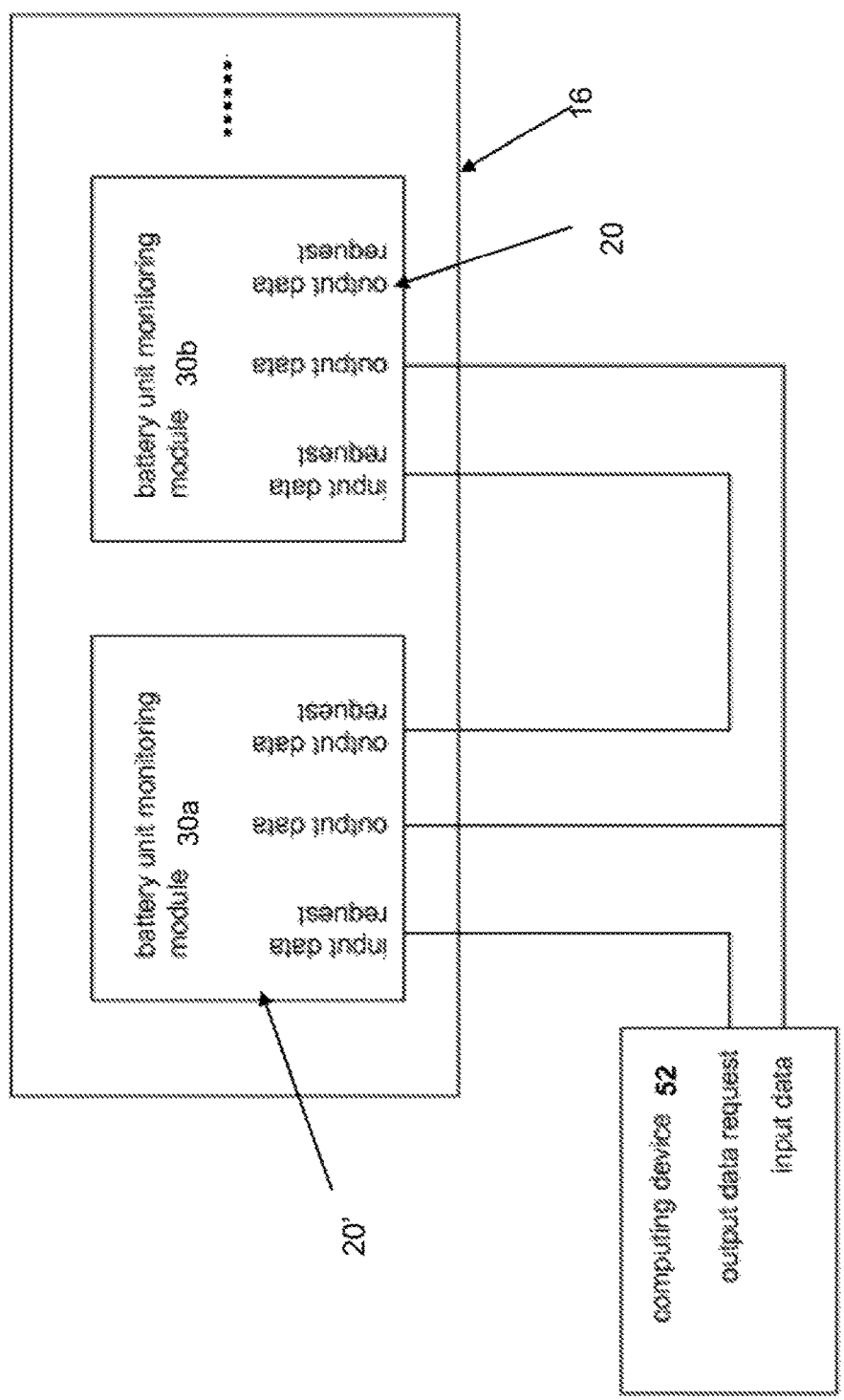
FIG. 3 is a block diagram depicting connections within the battery management system between the computing device and the battery unit monitoring modules.

FIG. 3 is a block diagram depicting connections within the battery management system 100 between the computing device 110 and the battery unit monitoring modules 105. The computing device 110 includes an output data request port (also referred to herein as an "enable output") and an input data port. Each monitoring module 105 includes an output data port, an input data request port (also referred to herein as an "enable input"), and an output data request port. Each monitoring module's 105 output data port is connected in parallel to the computing device's 110 input data port.

The computing device's 110 output data request port is connected to the first one of the battery unit monitoring module's 105a input data request port. The monitoring module's 105a output data request port is connected to the input data request port of the successive monitoring module 105b. In turn, the monitoring module's 105b output data request is connected to the input data request port of the next monitoring module 105c. The remaining monitoring modules 105 are connected in the same manner. The communications of the computing device 110 and battery unit monitoring modules 105 described herein are transmitted from and received at these ports, as would be understood by one of ordinary skill in the art. Further, in various embodiments, the computing device 110 and monitoring modules 105 include voltage and ground connections such that the computing device 110 can provide power (e.g., 12V) and ground to the monitoring modules 105.

In operation, to obtain data about the battery units 195, the computing device 110 sends a data request signal (also referred to herein as an "enable signal" or an "enable pulse") to the first battery unit monitoring module 105a. In response, the monitoring module 105e transmits data about a connected battery unit 195a to the computing device 110. After the module 105a finishes transmitting data, the module 105a sends a data request signal to the second battery unit monitoring module 105b. In response, the monitoring module 105b transmits data about a connected battery unit 195b to the computing device 110. After the module 105b finishes transmitting data, the module 105b sends a data request signal to the third battery unit monitoring module 105c, and the process continues for the rest of the monitoring modules 105.

Using this communication system, the computing device 110 can match data with a battery unit according to the order in which the device 110 receives data. Thus, the first set of data can be matched to the first battery unit 195a, the second set of data to the second unit 195b, and so forth. In this manner, the computing device 110 uses few ports for obtaining data and matching the data to battery units 195. In some embodiments, such a battery management system 100 may eliminate the needs for dedicated addressing ports, addressing switches, and/or jumpers.

When the computing device 110 does not receive data from a battery unit 195 for at least a predetermined period of time (e.g., 20 ms, although other times may be used), the computing device 110 can conclude that data collection for the battery pack 190 has been completed. The computing device 110 can obtain another set of data by transmitting another data request to the first battery unit monitoring module 105a, thereby restarting the data collection process. In some embodiments, the computing device 110 can collect data about the battery units 195, e.g., once per 1-2 seconds.

In some embodiments, the computing device 110 can first compare the number of data received with the number of monitoring modules 105. If the numbers match, the computing device 110 can determine all the monitoring modules 105 are operational and continue obtaining data about the battery units 195. If the numbers do not match, the computing device 110 can conclude that at least one monitoring module 105 and/or battery unit 195 is not operational. The computing device 110 can generate and output an error message to the display 115. Since the modules 105 transmit data to the computing device 110 in sequential order, the computing device 110 can identify the non-operational module 105 or unit 195 according to the number of data received. In this manner, the computing device 110 can inform a user of physical locations of faults in the monitoring modules 105 or battery pack 190, allowing the user to troubleshoot problems.

Regarding the individual monitoring modules 105, in some embodiments, a module 105 can measure data for a connected battery unit 195 upon receiving a data request signal. In some embodiments, a module 105 can measure and store data in a buffer. Then, when the module 105 receives the data request signal, the module 105 may access the buffer and may transfer the data stored therein to the computing device 110.

The monitoring module 105 can transmit the data to the computing device 110 in a human readable form. The monitoring modules 105 can transmit the data via an asynchronous serial protocol, such as protocols used for RS-232 or USB connections. The monitoring modules 105 can transmit the data at any rate and with any number of start and/or stop bits. For example, a module 105 can transmit at 9600 Baud with 1 start bit and 1 stop bit.

Figure 4:
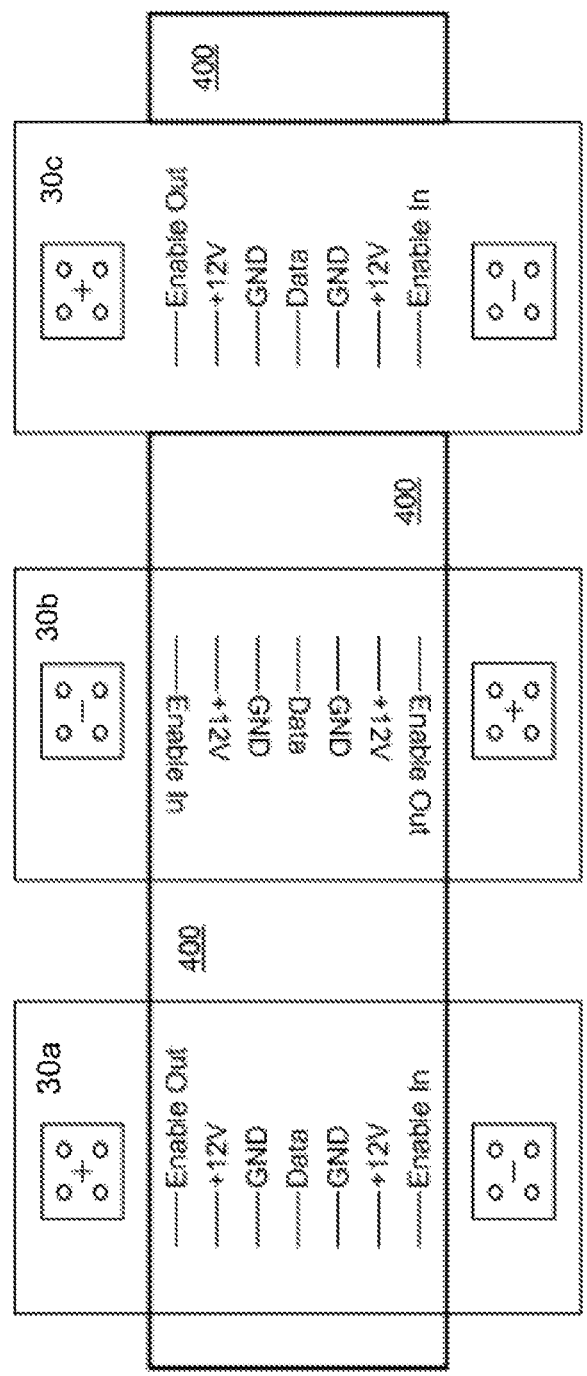
FIG. 4 is a diagram depicting connections between battery unit monitoring modules.

Referring now to FIG. 4, a diagram depicting connections between battery unit monitoring modules 105 is shown and described. In some embodiments, wiring 400 (e.g., ribbon cable, 4-wire round shape harnesses) can be used to connect the monitoring modules 105 to one another. In some embodiments, for each monitoring module 105, the output data port can be located in the center of a module's 105 interface. In some embodiments, the input data request port and the output data request port can be symmetrically located on opposite sides of the output data port. By orienting each battery unit monitoring module 105 in an opposite direction from adjacent modules 105, wiring 400 can connect the output data request port of one module 105 to the input data request port of the successive module 105. Due to the orientation of the ports, the wiring 400 need not be twisted or folded. Further, the wiring 400 can connect all the output data ports to the input data port of the computing device 110. When a monitoring module 105 transmits data for its connected battery unit 195, the data can be sent across each portion of wiring 400 connecting the monitoring modules 105 before the data arrives at the computing device 110.

Figure 5:
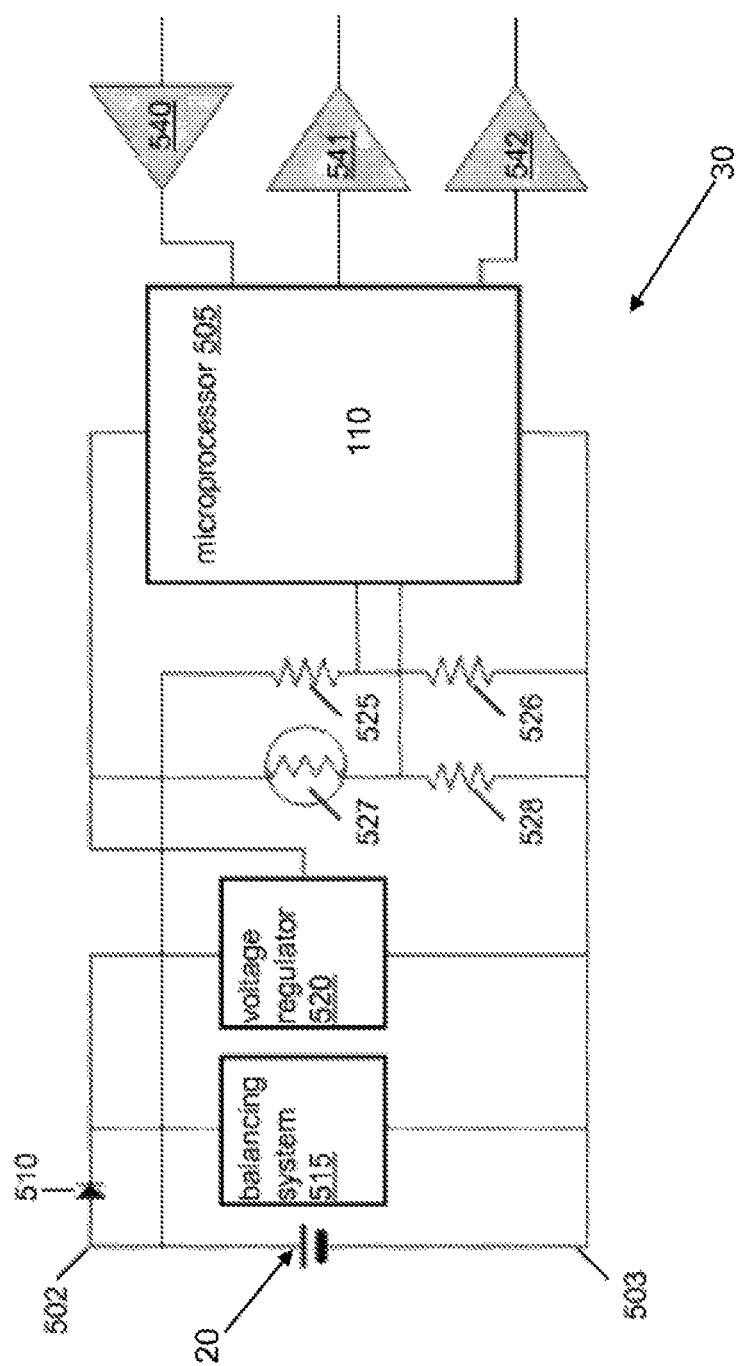
FIG. 5 is a hybrid block and circuit diagram depicting an exemplary battery unit monitoring module.

FIG. 5 is a hybrid block and circuit diagram depicting an exemplary battery unit monitoring module 105. The monitoring module 105 includes terminals 502 and 503, a microprocessor 505, a reverse connection protection system 510, a battery unit balancing system 515, a voltage regulator 520, resistors 525, 526 for sampling a battery unit's 195 voltage, and a temperature monitoring device 527 (e.g., a thermistor) for sampling a battery units 195 temperature. The monitoring module 105 also includes a receiver 540 for receiving a data request signal from a computing device 110 or monitoring module 105, a driver 541 for transmitting data of the connected battery unit 195 to the computing device 110, and a driver 542 for transmitting a data request signal to another monitoring module 105.

A battery unit 195 connects to the monitoring module 105 at terminals 502 and 503. Thus, the battery unit 195 applies its voltage to the reverse connection protection system 510. If the voltage is sufficiently high, the protection system 510 conducts and applies the voltage to the voltage regulator 520, resistors 525, 526, temperature monitoring device 527, and balancer 515. If the battery unit 195 is improperly connected to the terminals 502, 503 (e.g., with incorrect polarity), the reverse connection protection system 510 does not conduct, thereby protecting the module 105 from potentially damaging voltages.

When the protection system 510 conducts, the voltage regulator 520 can draw upon the battery units 195 voltage to supply a stable voltage (e.g., 2V) for the monitoring module 105. In particular, this voltage can power the microprocessor 505. The microprocessor 505 can obtain the battery unit's 195 voltage via resistors 525 and 526 and/or the temperature via temperature monitoring device 527. In some embodiments, the microprocessor 505 can sample the values on the resistors 525, 526 and temperature monitoring device 527 to obtain the voltage and temperature. The microprocessor 505 can store the values in an internal memory.

In some embodiments, when the receiver 540 receives a data request signal, the receiver 540 transmits the signal to the microprocessor 505. In response, the microprocessor 505 obtains the voltage and temperature of the battery unit 195, either by measuring the values on the resistors 525, 526 and temperature monitoring device 527 or by accessing stored values in an internal memory. The microprocessor 505 transmits the values to the driver 541, which drives the values back to the computing device 110 via, for example, asynchronous serial ASCII communication. At substantially the same time, the microprocessor 505 can generate and output a data request signal to the driver 542. The driver 542 drives the data request signal to the next monitoring module 105 for obtaining data about its connected battery unit 195.

Figure 6:
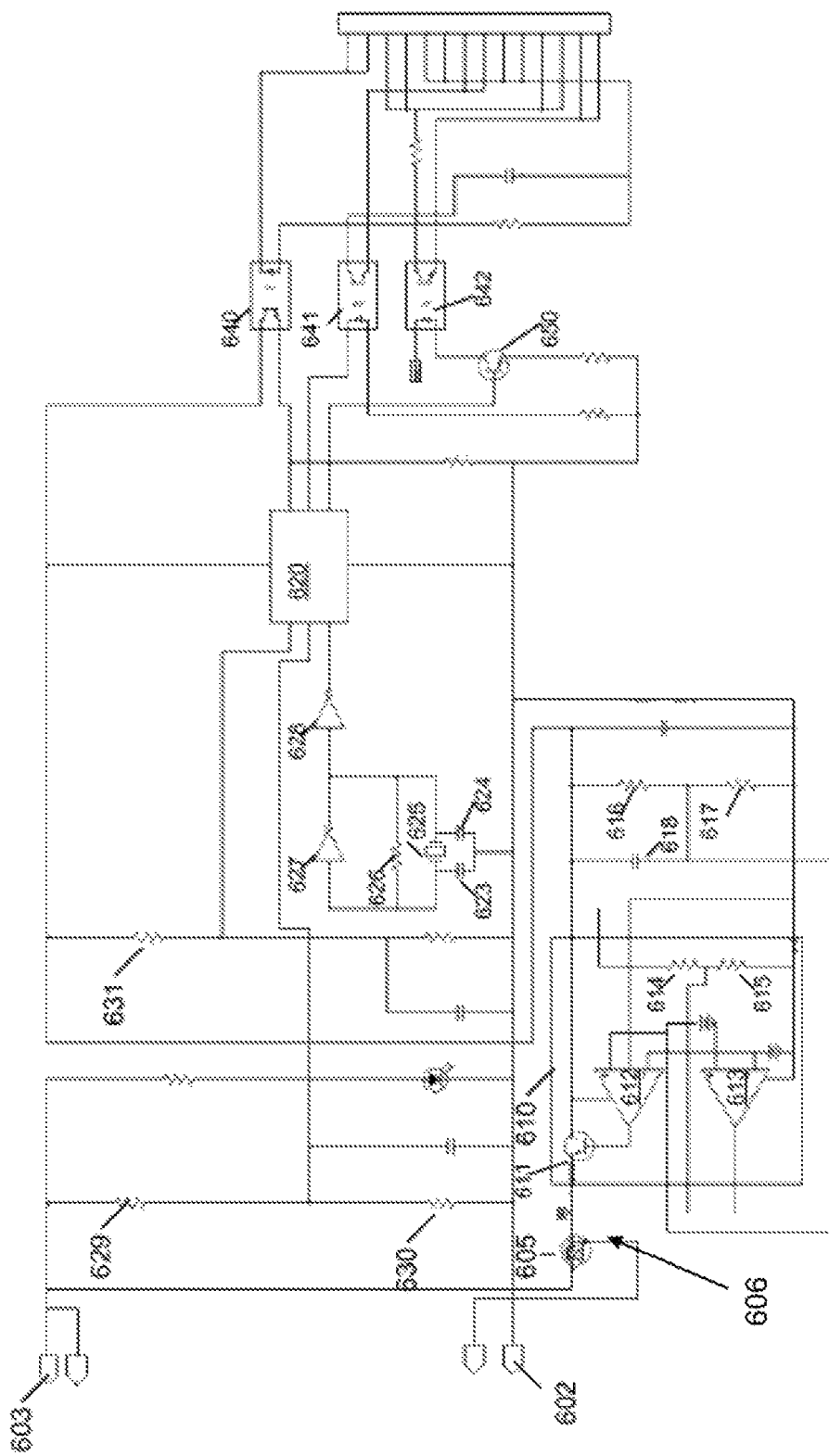
FIG. 6 is a circuit diagram of an exemplary embodiment of a battery unit monitoring module.

Referring now to FIG. 6, a circuit diagram of an exemplary embodiment of a battery unit monitoring module 105 is shown and described. In this embodiment, the terminals 602, 603 correspond to the terminals 502, 503 of FIG. 5. The protection system 510 can be a metal-oxide-semiconductor field effect transistor (MOSFET) 605, such as a p-type MOSFET. Terminals of the battery unit 195 can connect to both the source and base of the MOSFET 605. When the battery unit's 195 voltage is sufficiently high, the voltage activates the MOSFET 605. As the MOSFET 605 conducts, the battery unit 195 applies its voltage to the voltage regulator 610. If the battery units 195 voltage is insufficiently high, or its polarity is reversed, the MOSFET 605 does not conduct, thereby protecting the module 105 from potentially damaging voltages. In this manner, the MOSFET 605 can operate as a low voltage drop diode.

The voltage regulator 610 can be an integrated circuit (e.g., a LP2951) which can use a transistor 611, two operational amplifiers 612, 613, and two resistors 614, 615 to regulate a voltage. Resistors 616, 617 can divide the output of the voltage regulator 610 to, for example, 2V. The divided voltage can be fed back to the error amplifier 612, and the regulator 610 can adjust the output accordingly. In this manner, the voltage regulator 610 can output a substantially constant voltage. The capacitor 618 can filter the divided voltage before supplying the voltage to a microprocessor 620. Further, a power supply can power a clock generator (with capacitors 623, 624, an oscillator 625, resistor 626, and buffers 627, 628) to generate a clock signal. The clock signal can be provided to the microprocessor 620 for its operations.

The battery unit 195 can connect, via the terminals 602, 603, to resistors 629, 630 and a thermistor 631. A node between the resistors 629, 630 and a node adjacent to the thermistor 631 can connect to input ports of the microprocessor 620, which in turn can connect to an internal analog-to-digital converter (also referred to herein as A/D converter). One of the inputs to the internal A/D converter can sample the voltage between the resistors 629, 630 to determine the voltage of the battery unit 195. Another input to the internal A/D converter can sample the temperature of the battery unit 195, expressed as a voltage, via the thermistor 631. The microprocessor 620 can store the voltage and temperature in an internal memory. In some embodiments, the microprocessor 620 connects to separate A/D converters that sample the voltage and temperature.

The microprocessor 620 can receive a data request signal via the receiver 640 (e.g., an optocoupler). In response, the microprocessor 620 can obtain the voltage and temperature of the battery unit 195 and transmit the values to the driver 641, which drives the values back to the computing device 110. At substantially the same time, the microprocessor 620 can generate and output a data request signal. The data request signal can connect to the base of a transistor 650. When the signal turns on the transistor, current flows through the driver 642 to output another data request signal to the next monitoring module 105.

Figure 7:
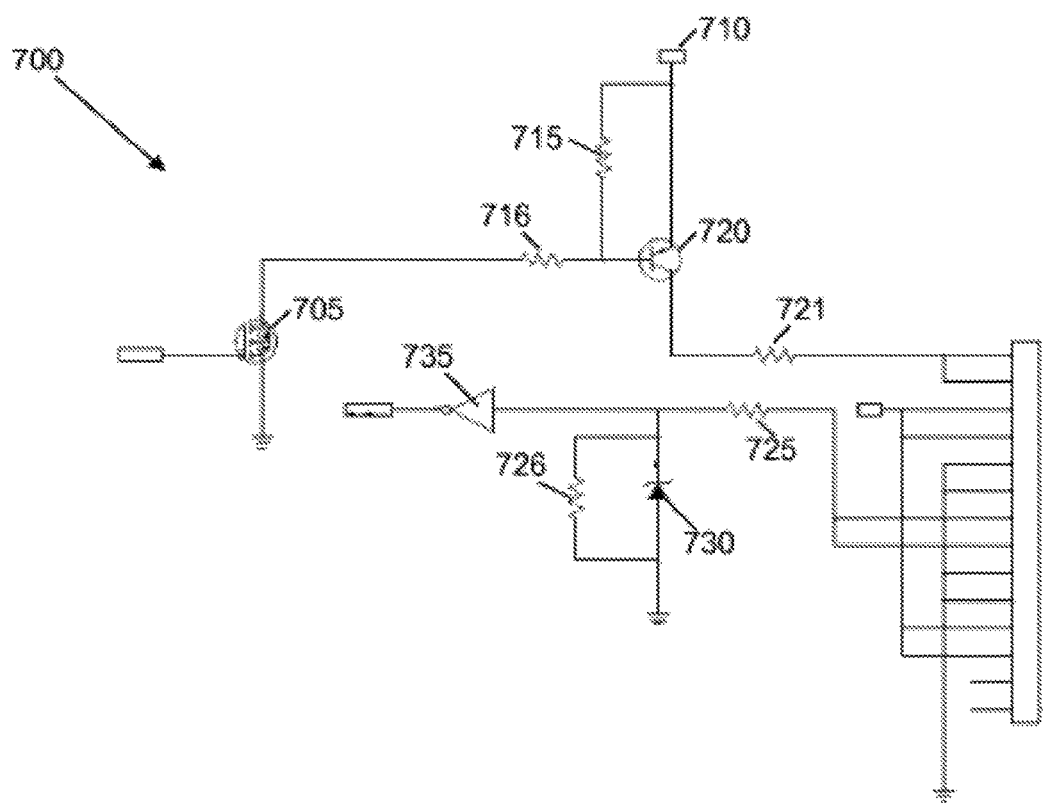
FIG. 7 is a circuit diagram of an exemplary embodiment of the interface for a computing device.

FIG. 7 is a circuit diagram of an exemplary embodiment of an interface 700 for the computing device 110. The interface 700 can be used by the computing device 110 for communicating with to battery unit monitoring modules 105. The computing device 110 can apply a data request signal to the gate of a transistor 705, such as a metal-oxide-semiconductor field-effect transistor (MOSFET). In response, the transistor 705 conducts and current flows from the voltage source 710 through the resistors 715, 716. The voltage that develops at the node between the resistors 715, 716 activates the transistor 720. As a result, current flows from the voltage source 710 through the transistor 720 and resistor 721 to output a data request signal (e.g., a logic high signal) for the first battery unit monitoring module 105.

The circuit can receive a data signal (e.g., as 12V signal) through the TX pins on a connector. Resistors 725, 726 can divide the data signal, and the Zener diode 730 can clamp the data signal to a voltage substantially equal to the voltage supplied to the battery unit monitoring module's microprocessor (e.g., 3.3V). An inverter 735, such as a Schmitt Trigger inverter, can eliminate noise and sharpen the rise and fall times of the divided and/or clamped data signal before passing the data signal to the microprocessor of the computing device 110.

In various embodiments, the interface 700 can be located on the same board as the other components of the computing device 110. In some embodiments, the communication interface can be isolated from those other components.

Figure 8:
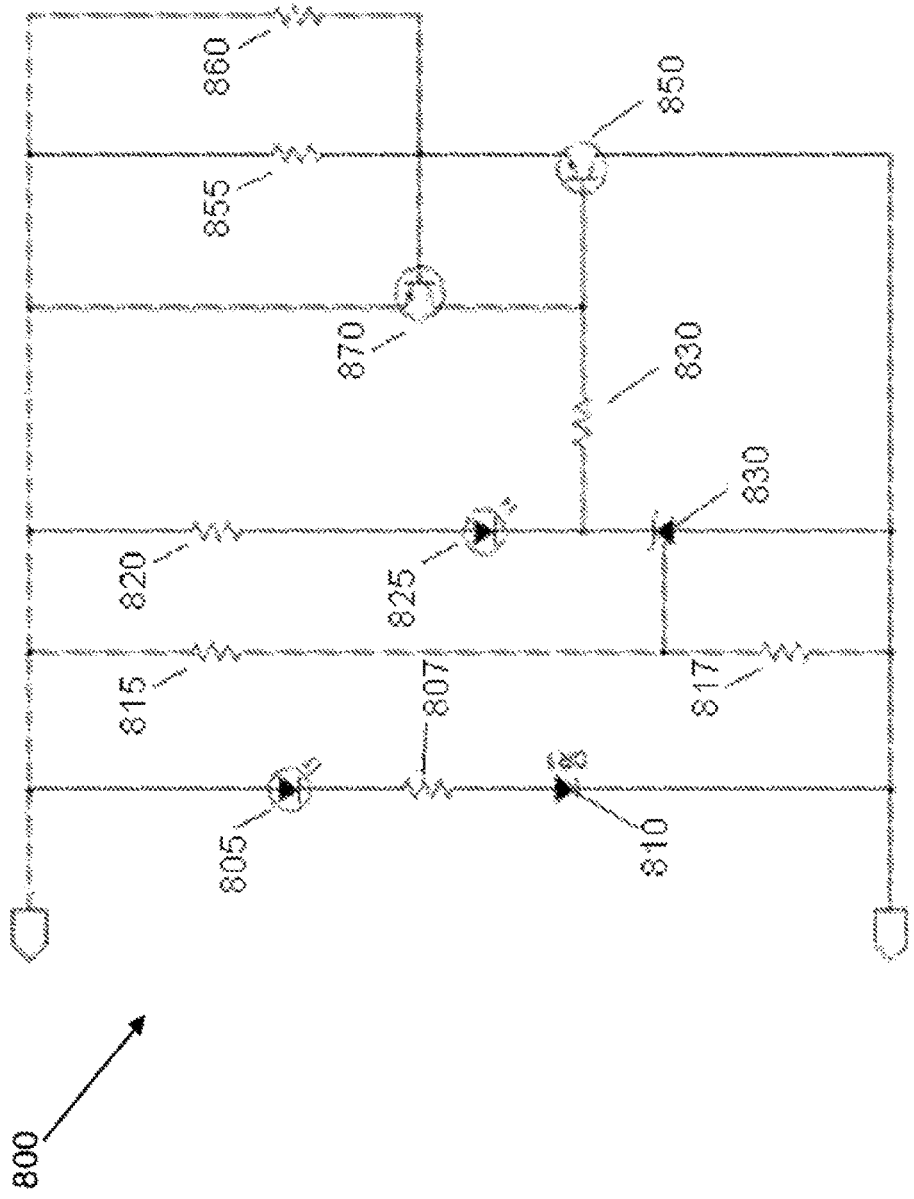
FIG. 8 is a circuit diagram of an exemplary embodiment of a battery unit balancing system in a battery unit monitoring module.

FIG. 8 is a circuit diagram of an exemplary embodiment of a balancing unit 800 of a battery unit monitoring module 105. The operation of the balancing unit is described in U.S. application Ser. No. 12/939,889, entitled "Battery Unit Balancing System," filed Nov. 4, 2010, the contents of which are hereby incorporated by reference in their entirety.

Figure 9:
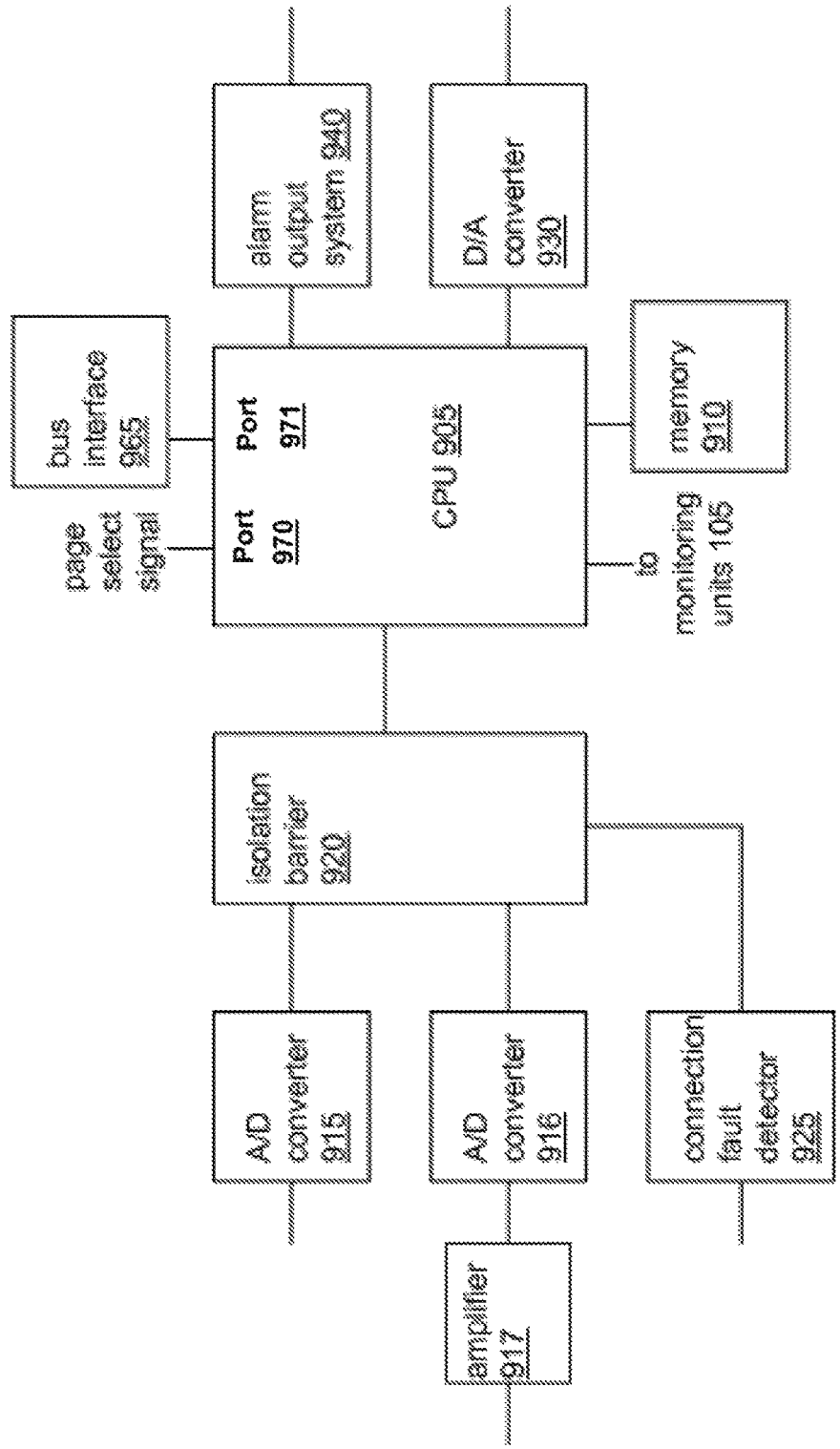
FIG. 9 is a block diagram depicting an exemplary embodiment of the computing device of the battery management system.

FIG. 9 is a block diagram depicting an exemplary embodiment of the computing device 110 of the battery management system 100. The computing device 110 can include a central processing unit (CPU, e.g. 8-core processor) 905 and a memory 910 (e.g., electrically erasable programmable read-only memory, or EEPROM serial memory) that stores a program with executable instructions. The program can be loaded into the memory 910 from an external device connected via, for example, the bus interface 965 or a USB cable. The CPU 905 can load and execute instructions from the memory 910 to perform its operations. The program may include configuration data, such as the predetermined number of battery unit monitoring modules 105 in the system 100 or the threshold battery unit voltage or temperature that would trigger an error condition. In some embodiments, the program may obtain the configuration data from values input by a user of the system 100.

The computing device 110 can use an analog-to-digital (A/D) converter 915 to measure the voltage of the battery pack 190. The A/D converter 915 can sample the voltage to obtain a value. The computing device 110 can use an analog-to-digital (A/D) converter 916 to measure the current of the battery pack 190. In some embodiments, the A/D converter 916 is connected to a shunt, which in turn is connected to a terminal of the battery pack 190 and a terminal of the external load 198. The shunt can be a resistor that develops a voltage drop proportional to the battery pack's 190 current (e.g., 0.0001 Ohms developing a voltage drop of 0.1 mV/A). An amplifier 917 can amplify the value of the current before the A/D converter 916 samples the current. The A/D converters 915, 916 can direct the battery pack voltage and current to an isolation barrier 920 controlled by a signal from a connection fault detector 925. In some embodiments, the A/D converters 915, 916 are on the same board as the CPU 905, isolated, and/or both.

The connection fault detector 925 can signal the presence of a connection between a battery unit 195 and a zero-voltage reference level. For example, the zero-voltage reference level can be the battery pack's 190 enclosure or chassis, and the connection between a battery unit 195 and the chassis would represent a hazard to service personnel. When one or more battery units 195 within the battery pack 190 contacts a point at the zero-voltage reference level, the contact can cause current to flow from the battery unit 195. The connection fault detector 925 detects the connection and outputs a signal to the CPU 905 which will display a warning indicating this connection on the display device 115.

The CPU 905 can connect to the battery unit monitoring modules 105 to obtain data about the individual battery units 195, as described in reference to FIGS. 3-5. The CPU 905 can process data about the individual battery units 195 and/or battery pack 190 to create a composite video signal. A digital-to-analog (D/A) converter 930 (e.g., a 3-bit converter) can produce the composite video signal from digital to analog format so the signal can be displayed on a display 115.

If the CPU 905 detects an error condition, the CPU 905 can transmit an error signal to an alarm output system 940. The system 940 can be used to control a component and/or device that responds to the error signal (e.g., a charger that stops charging the battery pack 190, or a motor controller of an electric vehicle that stops discharging the battery).

The computing device 110 can include power supplies 960 (not shown on FIG. 9). The power supplies 960 supply voltages to components of the battery management system 100. In some embodiments, a power supply 960 can include an internal voltage regulator to provide a constant voltage. The power supplies 960 can be isolated from the other components of the computing device 110 to prevent damage to the device 110.

The computing device 110 can include an interface 965, such as a controller area network (CAN) interface. The interface can include ports, such as parallel port pins. The computing device 110 can connect to external devices via an interface (not shown). For example, the device 110 can connect to another computing device to receive a program to be stored in the memory 910.

The computing device 110 can include a port 970 for receiving a page select signal. A page can correspond to a format for displaying data about a battery unit 195 within the battery pack 190. For example, one page can display the data for the entire pack 190. Another page can display the voltages and temperatures of eight, twenty, or any other number of battery units 195. Successive pages can display the same information for adjacent sets of battery units 195. The computing device 110 can receive the page select signal from a switch mounted in a dashboard in an electric vehicle, for example (not shown). In response, the computing device 110 can output the selected page containing battery pack data to the display 115.

Figure 10:
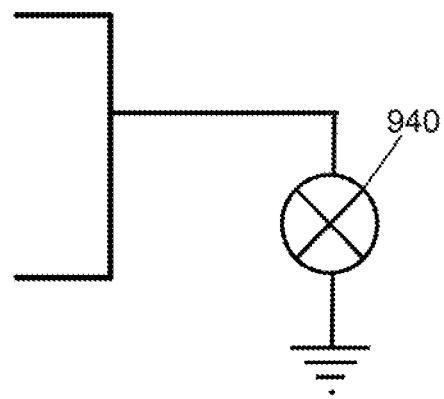
FIG. 10 is a block diagram depicting an exemplary embodiment of the alarm output system of the computing device.
Figure 10:
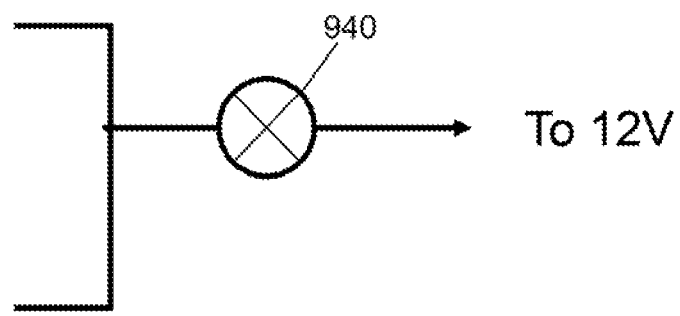

FIG. 10 is a block diagram depicting an exemplary embodiment of the alarm output system 940 of the computing device 110. The alarm output system 940 receives an error signal from the computing device 110. The alarm output system 940 outputs a binary signal according to the error signal. If the error signal corresponds to an off signal, the system 940 allows current to flow to a ground reference, thereby outputting a logic low signal (e.g., 0V). If the error signal corresponds to an on signal, the system 940 allows current to flow from a voltage source, such as 12V. In some embodiments, the system 940 does not allow current to flow until the error signal lasts at least 30 seconds. In this manner, the system 940 turns on or off external devices according to the presence of an error.

Figure 11:
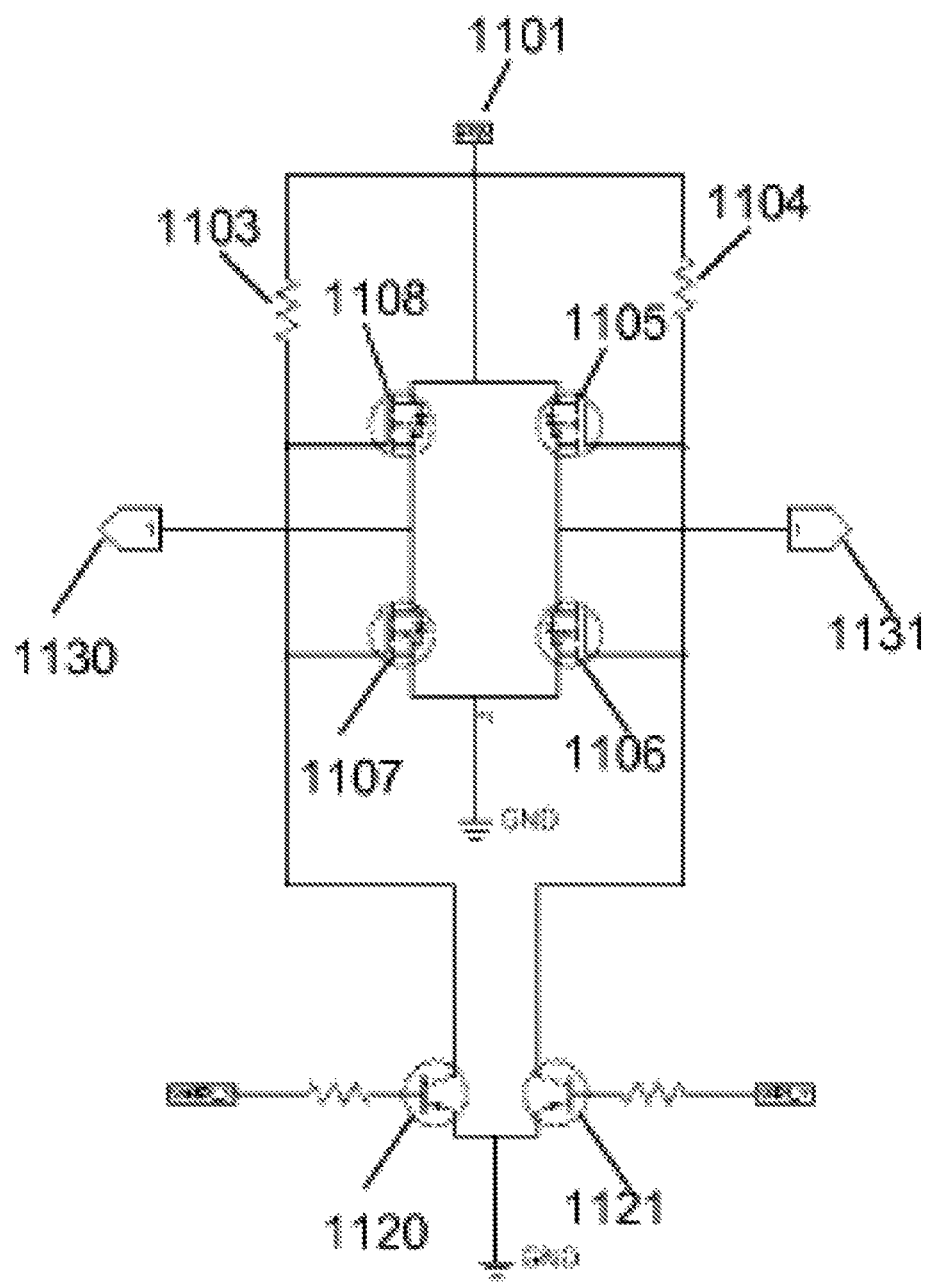
FIG. 11 is a circuit diagram depicting an exemplary embodiment of the alarm output system of the computing device.

FIG. 11 is a circuit diagram depicting an exemplary embodiment of the alarm output system 940 of the computing device 110. The alarm output system 940 includes a voltage source 1101, two resistors 1103, 1104, four transistors (e.g., metal-oxide-semiconductor field-effect transistors or MOSFETs) 1105, 1106, 1107, 1108 configured to form an H bridge, and two transistors 1120, 1121 that operate the alarm output system 940. Transistors 1105, 1108 can be of opposite polarity from transistors 1106, 1107. The alarm output system 940 can apply one or more received error signals to the transistors 1120, 1121 and output one or more command signals corresponding to the error signals at terminals 1130, 1131.

In operation, an error signal can be applied to transistor 1120 and/or transistor 1121. If the computing device 110 detects a low voltage condition, the device 110 can apply an error signal to transistor 1120. As transistor 1120 conducts, the voltage applied to the gates of transistors 1107, 1108 by the voltage source 1101 drops. The voltage differential between the source and gate of transistor 1107 decreases to turn the transistor 1107 off. The voltage differential between the source and gate of transistor 1108 increases to turn the transistor 1108 on. As transistor 1108 conducts, current flows from the voltage source 1101 through the transistor 1108 to the output terminal 1130. The voltage that develops on the output terminal 1130 can be used to shut off a motor controller, by way of example.

If the computing device 110 detects a high voltage condition, a high current condition, or a high temperature condition, the device 110 can apply an error signal to transistor 1121. As transistor 1121 conducts, the voltage applied to the gates of transistors 1105, 1106 by the voltage source 1101 drops. The voltage differential between the source and gate of transistor 1106 decreases to turn the transistor 1107 off. The voltage differential between the source and gate of transistor 1108 increases to turn the transistor 1105 on. As transistor 1105 conducts, current flows from the voltage source 1101 through the transistor 1105 to the output terminal 1131. The voltage that develops on the output terminal 1130 can be used to shut off a battery charger or turn on a fan, by way of example.

Figure 12:
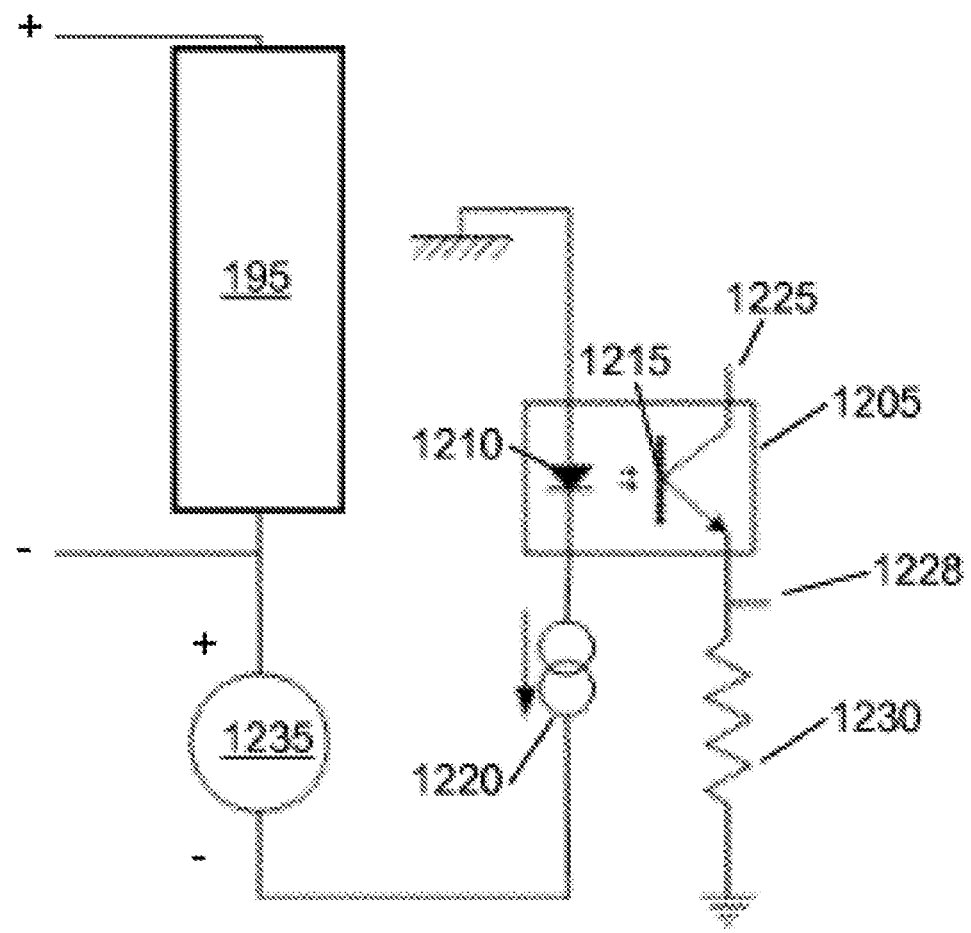
FIG. 12 is a block diagram depicting an exemplary embodiment of the connection fault detection system of the computing device.

FIG. 12 is a circuit diagram depicting an exemplary embodiment of the connection fault detection system of the computing device. The connection fault detection system includes an optocoupler 1205 with a light emitting diode 1210 and a transistor 1215, such as a phototransistor. One terminal of the light emitting diode 1210 connects to ground (also referred to herein as "a node at a ground zero reference lever"), such as a chassis of an electric vehicle. The other terminal of the light emitting diode 1210 connects to a current sink 1220. One terminal of the transistor 1215 connects to a voltage source 1225. The other terminal connects to a node corresponding to the output 1228 of the optocoupler 1205 (also referred to herein as the "output node"). This node connects to a resistor 1230 that also connects to a ground zero reference level, which can be electrically isolated from the battery pack 190. The current sink 1220 connects to the negative terminal of a voltage source 1235. The positive terminal of the voltage source 1235 connects to the negative terminal of at least one battery unit 195 of the battery pack 190.

In operation, when none of the terminals of the battery units 195 connect to ground, current does not flow through the light emitting diode 1210 of the optocoupler 1205. The light emitting diode 1210 does not activate the transistor 1215, and the transistor 1215 does not conduct. Because the node 1228 corresponding to the optocoupler's 1205 output is disconnected from the voltage source 1225, any charge at the node drains through the resistor 1230 to ground. In this manner, the optocoupler 1205 outputs a logic low signal, such as 0V, indicating that a connection fault has not been detected.

When a positive terminal of a battery unit 195 does connect to a zero-voltage reference level, current flows through the light emitting diode 1210 to the current sink 1220. The current activates the transistor 1215 so the transistor 1215 conducts. Current flows from the voltage source 1225, building charge at the output node 1228. Thus, the optocoupler 1205 outputs a logic high signal indicating that a connection fault has been detected. The logic high signal can be applied to CPU 905, which can output a message to the display device warning an operator of the battery unit management system of a potentially hazardous connection fault.

The voltage sources 1225, 1235 can have any voltage. For example, voltage source 1225 can provide 3.3V. Voltage source 1235 can provide 5.0V. The current sink 1220 can limit the current flowing through itself and the light emitting diode 1210 to any current, such as a minimum safe level of current. For example, the current sink 1220 can limit the current to 2 mA. The current sink 1220 can operate over a range of voltages of the battery pack 190, such as the voltages between the battery pack's 190 positive and negative terminals. In some embodiments, this range can be from about 5V to about 500V. In some embodiments, the current sink 1220 can operate at voltages that exceed the voltage at the positive terminal of the battery pack 190.

Figure 13:
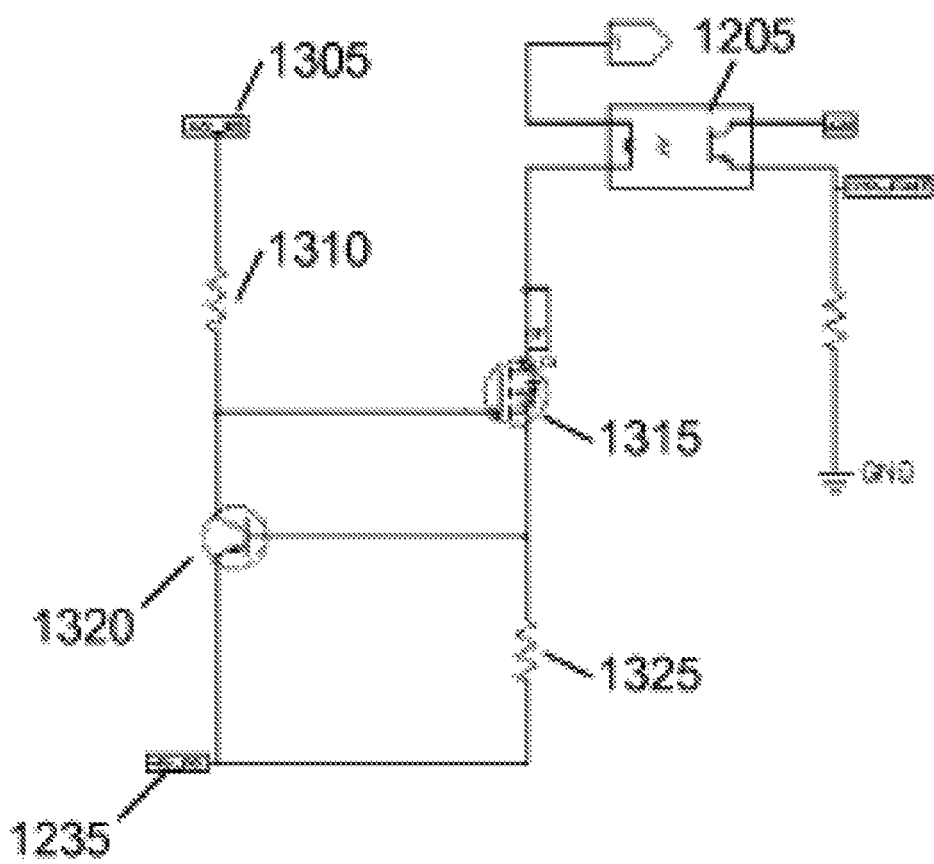
FIG. 13 is a circuit diagram depicting an exemplary embodiment of the connection fault detection system of the computing device.

FIG. 13 is another circuit diagram depicting an exemplary embodiment of the connection fault detection system of the computing device. This embodiment includes all the components described in reference to FIG. 12. In addition, in this embodiment, the current sink 1220 includes a voltage source 1305, a first resistor 1310, a first transistor 1315, a second transistor 1320, and a second resistor 1325. The voltage source 1305 connects to one terminal of the first resistor 1310. The other terminal of the first resistor 1310 connects to the gate of the first transistor 1315 and the emitter of the second transistor 1320. The source of the first transistor 1315 connects to the optocoupler 1205. The drain of the first transistor 1315 connects to the base of the second transistor 1320 and one terminal of the second resistor 1325. The other terminal of the second resistor 1325 connects to the collector of the second transistor 1315 and the negative terminal of the voltage source 1235.

In operation, current flows from the voltage source 1305 through the first resistor 1310 to activate the first transistor 1315 such that the first transistor 1315 conducts. When a terminal of a battery unit 195 connects to ground, current flows through the optocoupler 1205, the first transistor 1315, and the second resistor 1325. The voltage that develops across the second resistor 1325 activates the second transistor 1320. As the second transistor conducts 1320, current is diverted from the gate of the first transistor 1315. The transistors 1315, 1320 and resistors 1310, 1325 reach equilibrium such that a constant current flows through the first transistor 1315.

The transistors 1315 can be any type of transistor, such as a metal-oxide-semiconductor field-effect transistor (MOSFET), an insulated gate bipolar transistor (IGBT), or a NPN transistor. In some embodiments, a 2N3904-type transistor is used for the second transistor 1320.

Figure 14:
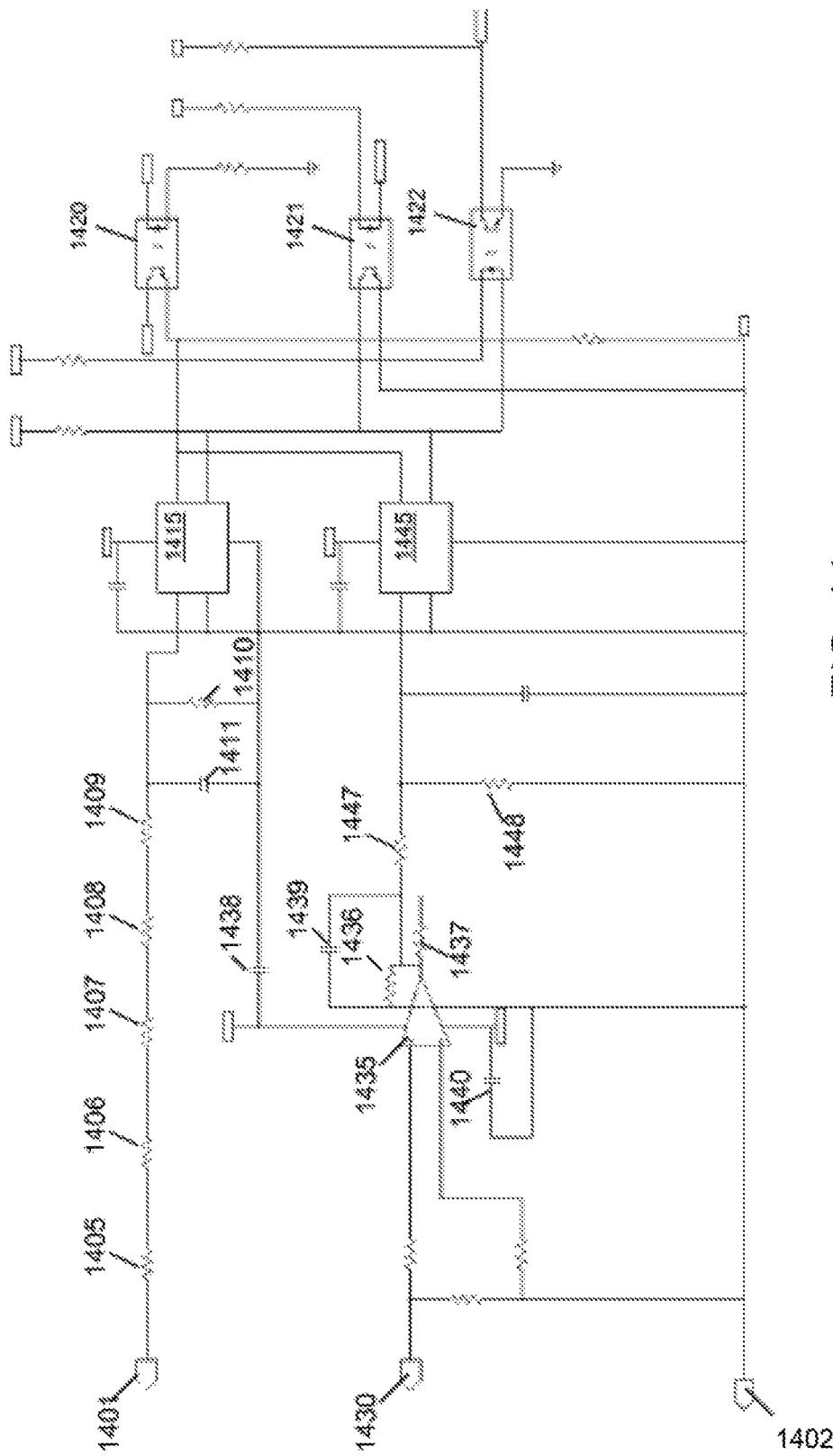
FIG. 14 is a circuit diagram depicting an exemplary embodiment of the pack voltage and pack current input systems of the computing device.

FIG. 14 is a circuit diagram depicting an exemplary embodiment of the pack voltage and pack current input systems of the computing device. The battery pack 190 can connect to the systems at terminals 1401, 1402. Resistors 1405, 14068, 1407, 1408, 1409, 1410 can divide the battery pack 190 voltage from 500V to 2V, by way of example. A capacitor 1411 can filter the divided voltage, and an A/D converter 1415 can sample the voltage. The A/D converter 1415 can transmit the voltage to a processor of the computing device 110, such as CPU 905. Optocouplers 1420, 1421, 1422 can create an isolated communication interface between the A/D converter 1415 and the processor.

The voltage drop across a shunt can be input at terminal 1430. The operational amplifier 1435, resistors 1436, 1437, and capacitors 1438, 1439, 1440 can form an amplifier to amplify the voltage drop. Because the amplifier has a fixed gain, such as 80, the amplified voltage may exceed the capacity of the A/D converter 1445 that samples the voltage. Thus, resistors 1447, 1448 can form a voltage divider that divides the amplified voltage to a level the A/D converter 1445 can process. The A/D converter 1445 can sample the voltage and transmit the voltage to the processor, which can calculate the battery pack 190 current based on the value of the shunt. The A/D converter 1445 can use the same communication interface as the A/D converter 1415 to transmit its sampled voltage.

Figure 15:
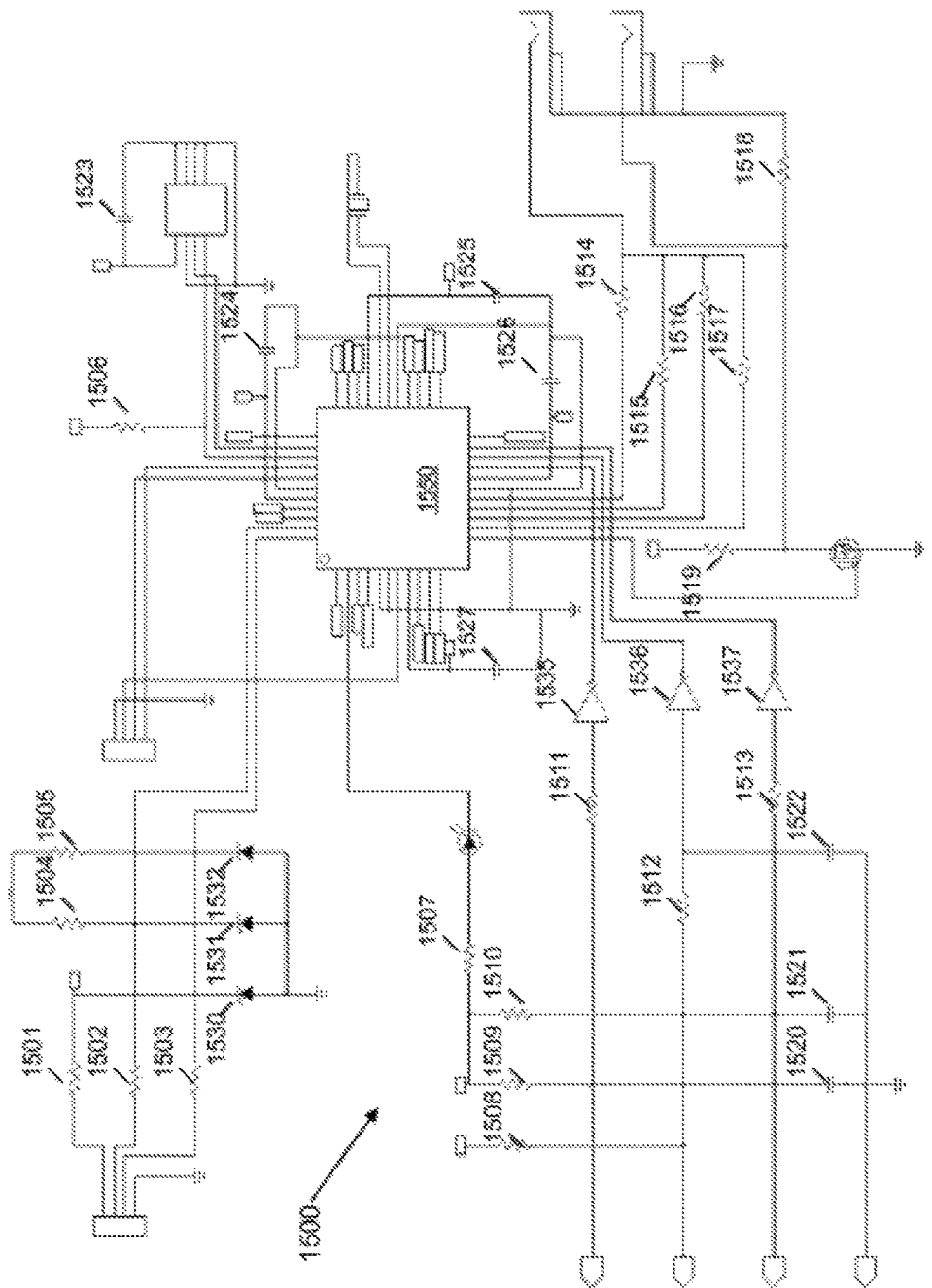
FIG. 15 is a circuit diagram depicting an exemplary embodiment of the processor of the computing device.

FIG. 15 is a circuit diagram depicting an exemplary embodiment 1500 of the central processing unit 905 of the computing device 110. Resistors 1501-1519, capacitors 1520-1527. Zener diodes 1530-1532, and inverters 1535-1537 condition the inputs and outputs for the central processing unit 1550.

Figure 16:
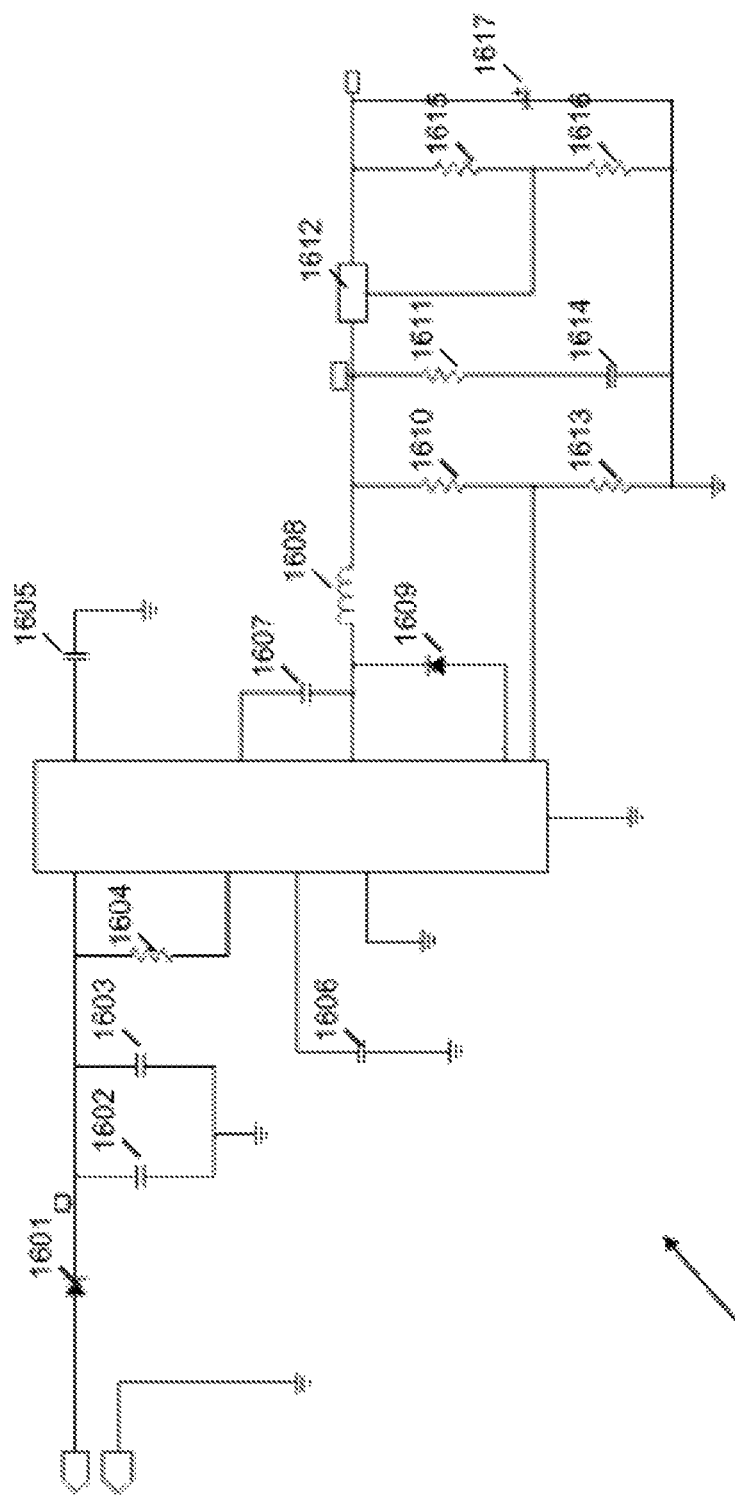
FIG. 16 is a circuit diagram depicting exemplary embodiments of power supplies used with the battery management system.

FIG. 16 is a circuit diagram 1600 depicting an exemplary embodiment of a power supply that can be used with the battery management system 100. The power supply 1600 can be a step down switching voltage regulator. The components 1601-1616 can operate to produce a voltage, such as 5V or 12V. In particular, component 1612 can be a linear voltage regulator that accepts a voltage produced by the other components of the system and outputs a substantially constant 3.3V.

Figure 17:
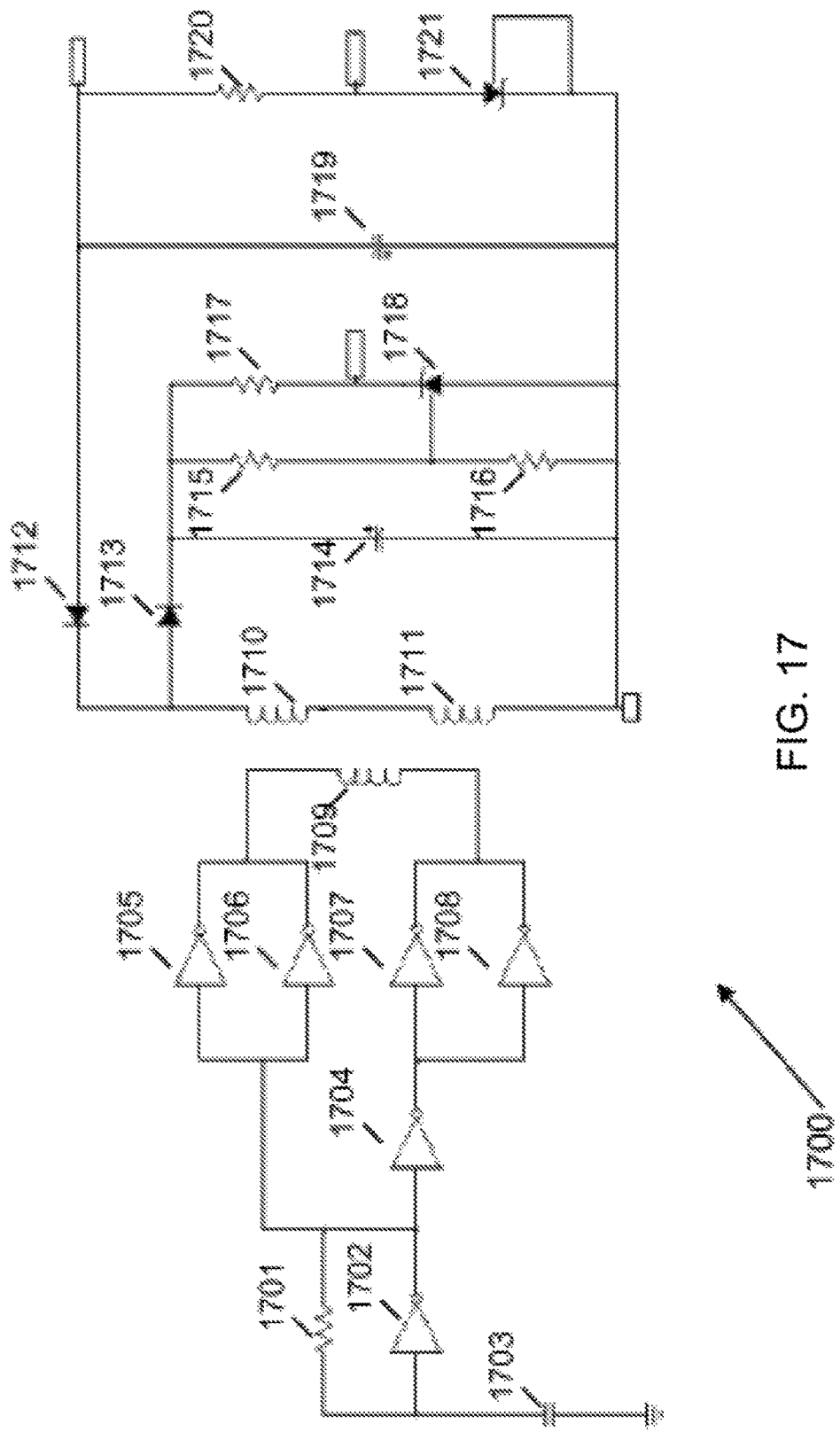
FIG. 17 is a circuit diagram depicting an isolated power supply to power the circuits of FIG. 14.

FIG. 17 is a circuit diagram 1700 depicting an exemplary embodiment of another power supply that can be used with the battery management system 100. The power supply 1700 can be an isolated power supply. Components 1701-1708 can operate as an oscillator that produces 40 KHz. The transformer with windings 1709-1711 can transfer energy produced by the oscillator to components 1712-1721, which can operate as positive and negative half-wave rectifiers and a shunt regulator. The rectifiers and shunt regulator can operate to produce a substantially constant output voltage.

Figure 18:
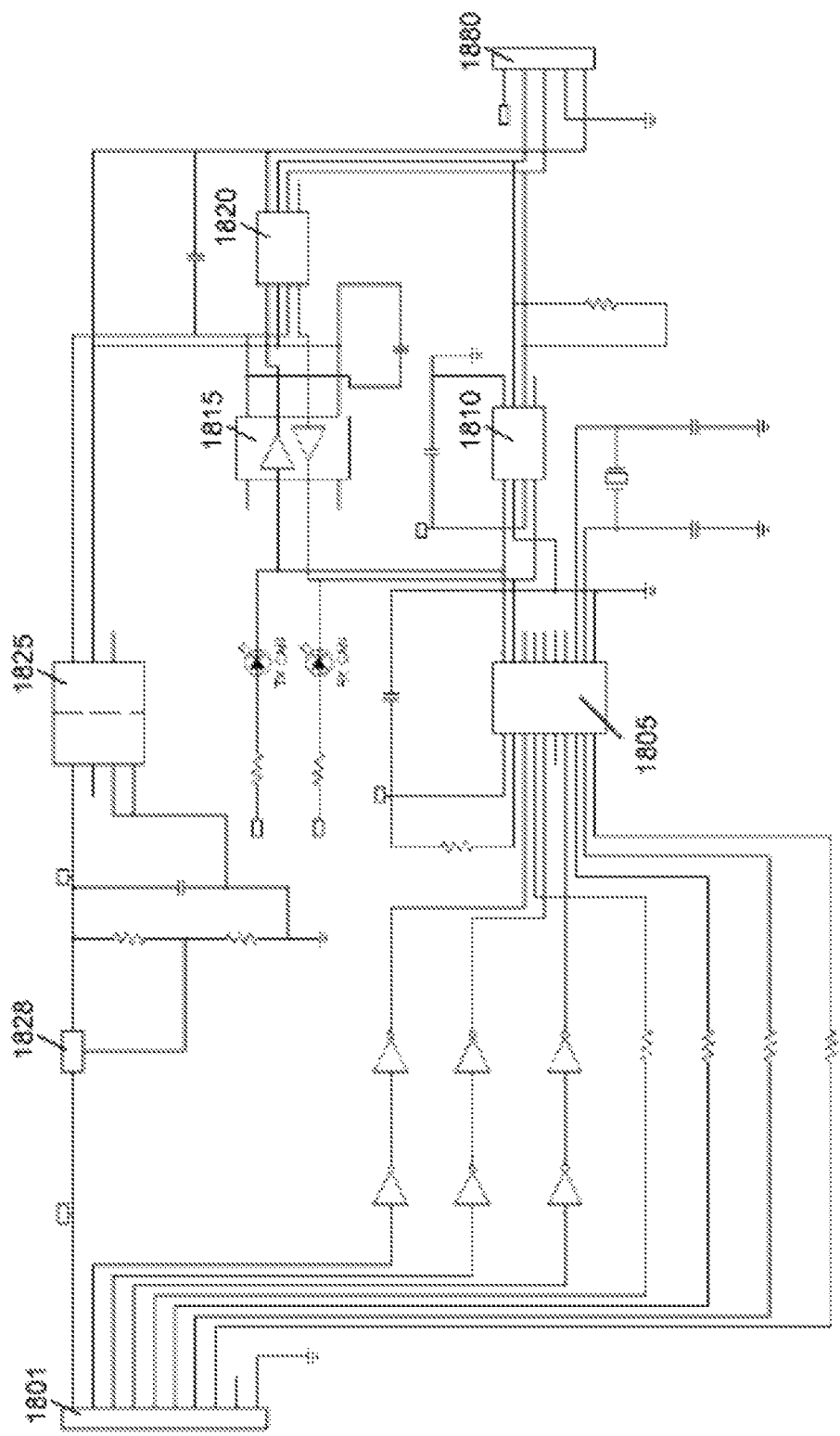
FIG. 18 is a circuit diagram depicting exemplary embodiments of a controller area network (CAN) interface.

FIG. 18 is a circuit diagram depicting an exemplary embodiment of a controller area network (CAN) interface used with the battery management system 100. The interface can be used to connect a CPU 905 of a computing device 110 with an external device via a CAN bus. A connector 1801 can attach to a component of the computing device 110, such as the CPU board. The other connector 1880 can attach to a CAN bus that connects to an external device. The computing device 110 and external device can communicate over the interface using a standard bus protocol such as a serial peripheral interface (SPI) protocol. In some embodiments, the devices can use handshaking signals, such as receiver buffer full and interrupt.

The interface chip 1805 can operate in a non-isolated mode or an isolated mode. In the non-isolated mode, the interface chip 1805 communicates with the bus buffer 1810 with data received, for example, from an external CAN-enabled device. In some embodiments, the bus buffer 1810 can receive data from the bus ports 1880. The interface chip 1805 can send a transmit signal to the buffer 1810 so the buffer 1810 outputs its data to the bus ports 1880. The interface chip 1805 can send a receive signal so the buffer 1810 outputs its data obtained from the bus ports to the interface chip 1805.

In the isolated mode, an isolator 1815 isolates the interface chip's 1805 transmit and receive signals from a buffer 1820. The isolator 1815 can be a magnetic isolator. An isolated power supply 1825 can use a voltage from a voltage regulator 1828 to provide power for the isolator 1815 and buffer 1820. In some embodiments, the voltage regulator 1828 receives a 12V signal and outputs a 5V signal.

In view of the structure, functions and apparatus of the system described herein, the present disclosure provides an efficient and intelligent battery management system. Having described certain embodiments of the battery management system, it will now become apparent to one of skill in the art that other embodiments incorporating the concepts of the disclosure may be used. Therefore, the invention should not be limited to certain embodiments, but should encompass the spirit and scope of the claims.

Figure 19:
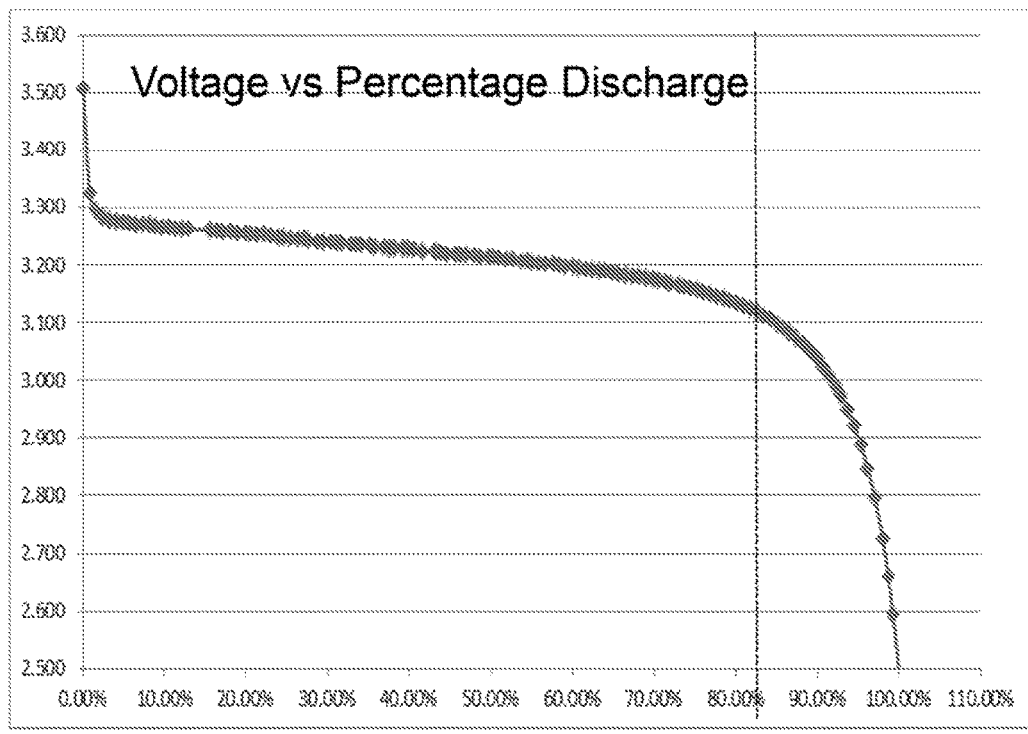
FIG. 19 shows an exemplary discharge profile for a lithium battery.

As shown in FIG. 19, a lithium battery has a non-linear discharge profile. The discharge rate from approximately 5% to 80% of full charge is substantially linear but has a very small slope. Therefore, it is difficult to estimate the state of charge of a battery, or battery unit by measuring the voltage. Small variations in voltage may result in erroneous estimates of the state of charge. As described herein, a power control system may calculate the time remaining before a battery pack should be shut down when being used as the output power supply. The power control system and specifically the computing device may initiate battery shut down if a calculated value of 80% discharged or more is reached.

Figure 20:
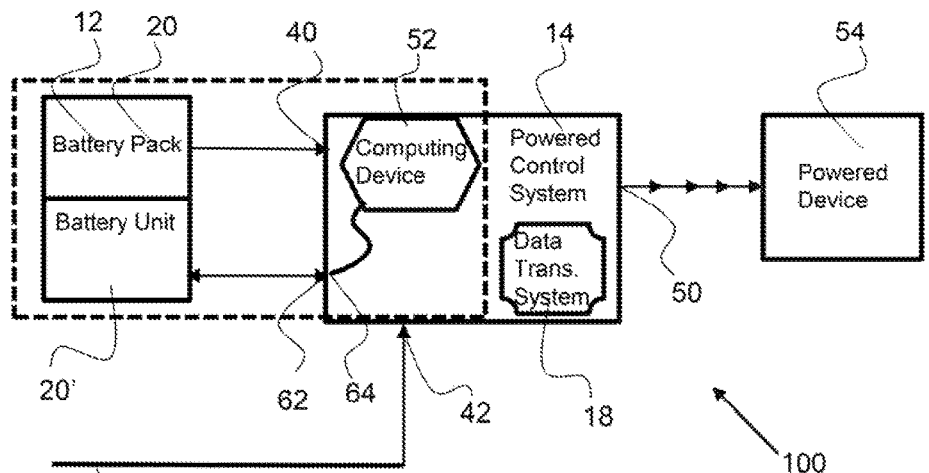
FIG. 20 shows a diagram of an exemplary lithium battery power supply system.

As shown in FIG. 20, an exemplary lithium battery power supply system 10 comprises a battery pack 12, and a power control system 14. The battery pack 12 has a first battery unit 20 and a second battery unit 20'. A battery data input provides data about the status of the battery unit and batteries configured therein to the computing device 52 through the battery data input 62. A computing device may request data from battery monitoring modules (not shown), through the data request output 64. The battery pack is coupled to the power control system 14 by a battery power input 40. An AC power input 42 is connected to an AC power line or cable. In an exemplary embodiment, the power control system utilizes the AC power for output power unless there is an interruption or disturbance in the incoming AC power. A data transmission system 18 is configured to send pertinent data related to the battery management system to an external location, such as a monitoring station. A powered device 54 is connected to the power control system at the power output connector 50. The battery management system 100 controls the charging and discharging of batteries and balances the battery system to prevent large variations between individual battery voltages within a battery pack. A discharge circuit may be used to reduce the voltage of a battery when has a voltage higher than the other batteries in the battery pack. This discharge circuit may be used as a battery heating circuit, wherein a resistor or transistor that heats with current flow acts as the heater for the battery.

Figure 21:
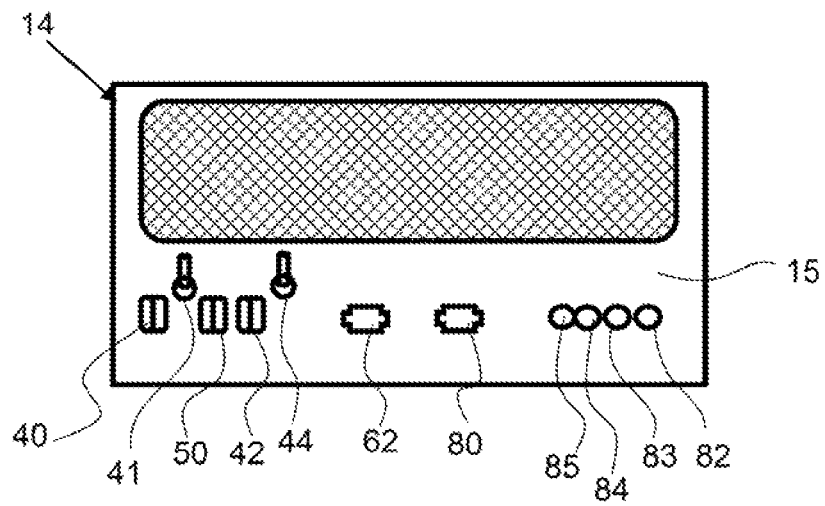
FIG. 21 shows an exemplary power control system and a plurality of input, outputs and indicators.

As shown in FIG. 21, an exemplary power control system 14 comprises a plurality of inputs, outputs and indicators. In an exemplary embodiment, a power control system is configured in a single enclosure 15, thereby making installation of the battery management system quick and easy. A battery power input 40 is configured to connect to a battery pack to receive power from said battery pack. A battery on/off switch 41 may be used to temporarily disable battery power in the event that the system requires maintenance or repair. An AC power switch 44 is also shown. A power output connector 50 is configured for providing power to an electronic device and may be any suitable type of plug. An AC power Input 42 is configured to couple to an AC power line or cable and may also comprise any suitable type of plug. An AC power switch is configured to enable or disable AC power input. A battery data input 62 is configured to couple to a battery monitoring module to receive data input regarding the battery pack, unit or individual batteries. As described herein a battery data input may be configured to receive a data transmission cable and in some embodiments comprises a wireless signal receiver. A remote data output connector 80 is configured to couple with a cable or line, such as a phone-line, DSL line, fiber optic line and the like. Again, a remote data output connector may be a wireless signal transmitter that is configured to send data output wirelessly. A number of indicators, such as lights, are also shown, a computing device indicator 85, a data reception indicator 84, a data transmit indicator 83 and an AC input indicator 82. These indicators may indicate that a particular function is current active.

Figure 22:
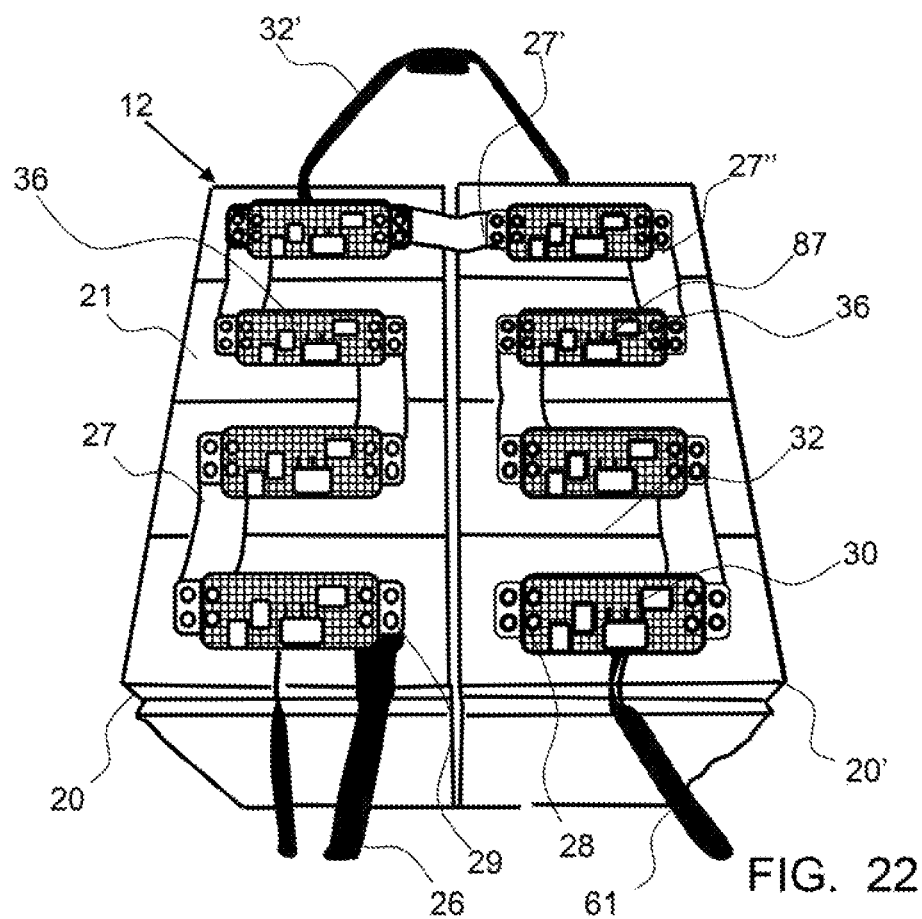
FIG. 22 shows a top perspective view of an exemplary battery pack with battery monitoring modules configured thereon.

As shown in FIG. 22, an exemplary battery pack 12 comprises two battery units 20 and 20', each having four individual lithium batteries 21. The batteries are all connected in series by jumpers 27. A jumper 27' connects the first battery unit 20 with the second battery unit 20'. Battery monitoring modules 30 are configured between the positive 28 and negative 29 terminals of the batteries. A battery monitoring module may comprise a voltage sensor 34 and/or a temperature sensor 36. A circuit 87 on a module 30 may be configured to determine the voltage state of a battery. Module connectors 32 connect battery monitoring modules in a daisy-chain configuration. Module connector 32' couples a battery monitoring module from the first battery unit to a battery monitoring module on the second battery unit. A battery power cable 26 is configured to provide power to the power control system. A battery module cable 61 is configured to couple with a battery data input, as shown in FIG. 22.

Figure 23:
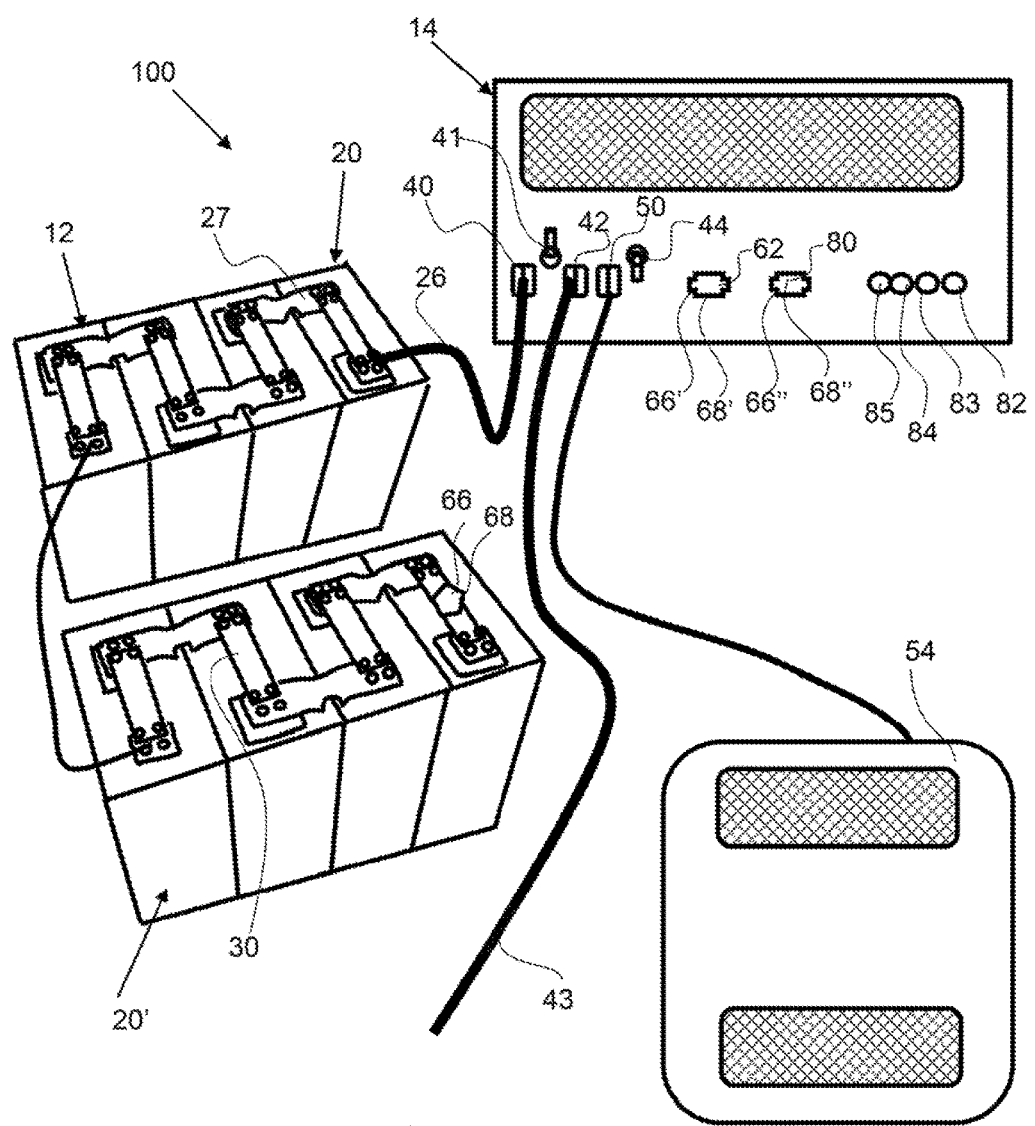
FIG. 23 shows diagram of an exemplary lithium battery power supply system.

As shown in FIG. 23, an exemplary battery management system 100 comprises a battery pack 12 and a power control system 14. In this exemplary embodiment, only a battery power cable physically couples the battery pack to the power control system. Data from the battery monitoring modules 30 is wirelessly transmitted to the power control system. A wireless transmitter 66 and wireless receiver 68 are coupled on the battery pack 10 and transmit battery status information to the control system. Likewise, the control system comprises a wireless transmitter 66' and wireless receiver 68' for requesting battery status information and receiving battery status information respectively. A powered device 54 is plugged into the power output connector 50. An AC power line 43 is coupled with the power control system.

Figure 24:
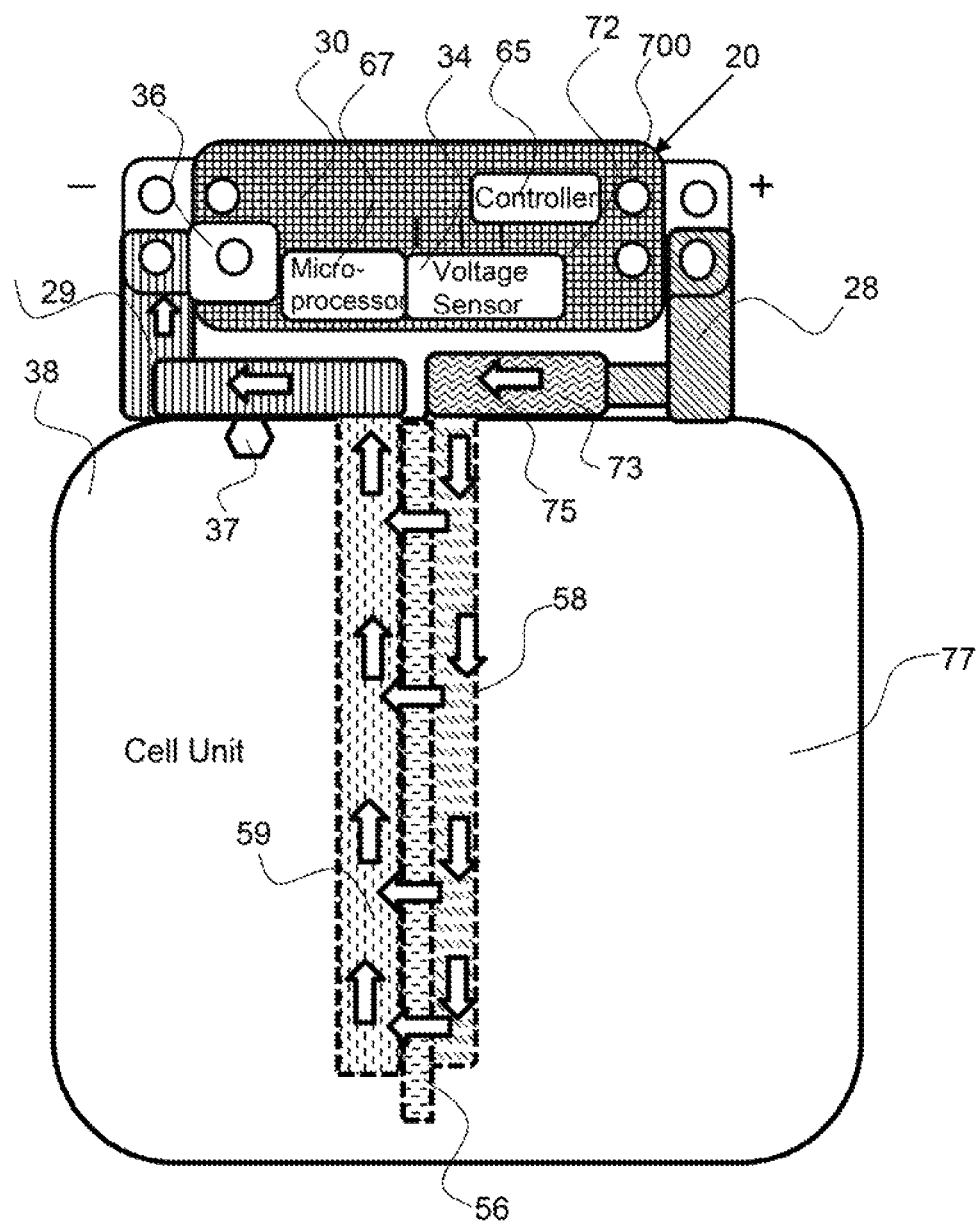
FIG. 24 shows a diagram of an exemplary battery unit having a single battery cell within the battery housing.
Figure 25:
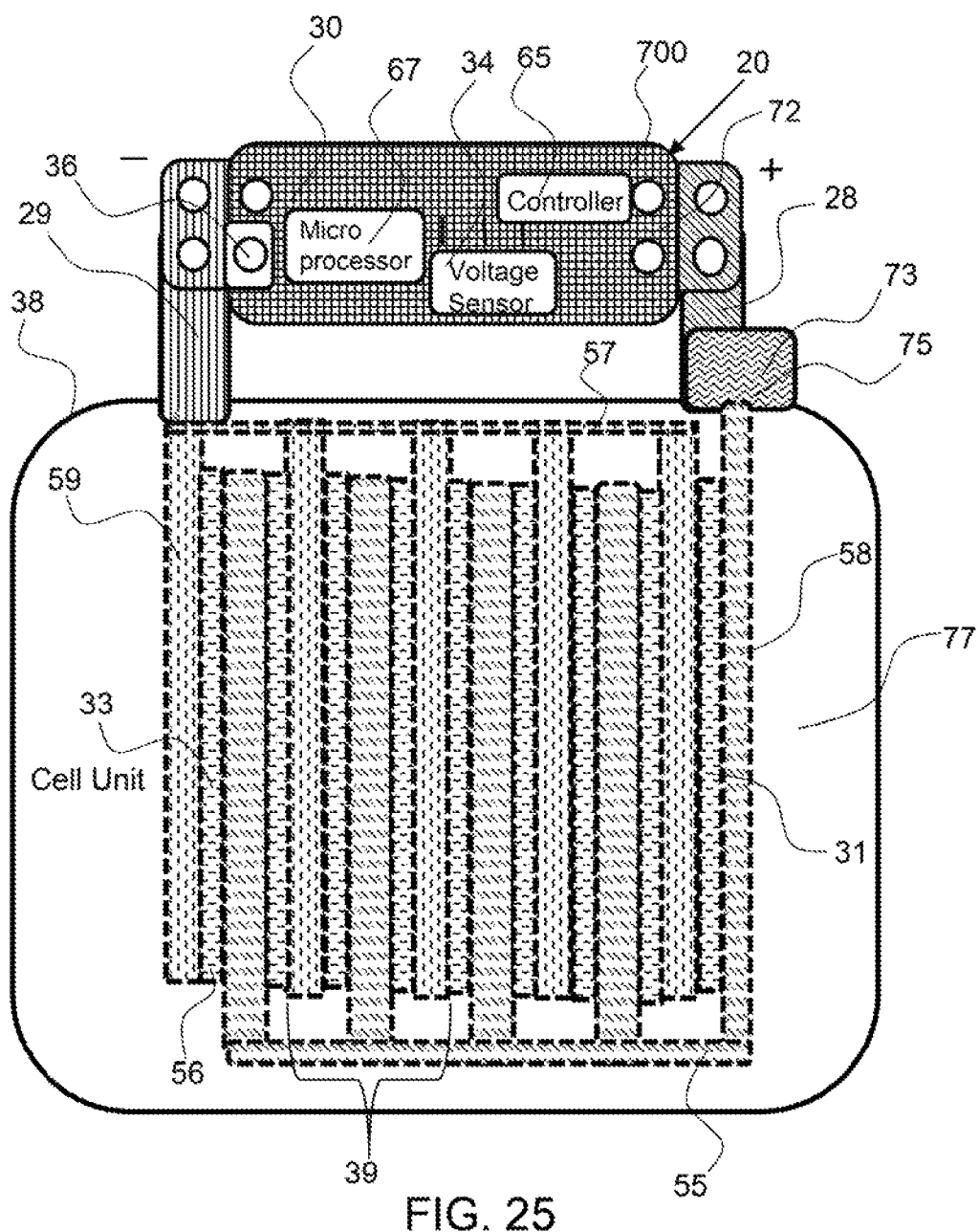
FIG. 25 shows a diagram of an exemplary battery unit having a battery cell with a plurality of cell stacks and dual cell unit electrodes.

As shown in FIGS. 24 and 25, an exemplary lithium battery power supply system comprises a positive terminal 28 and a negative terminal 29. The battery monitoring module 30 is configured between and coupled, electrically with the two terminals. A battery discharge circuit 72 is coupled with the battery monitoring module and can drain charge from the battery unit 20, such as in the event of a charge above a threshold value. This discharge circuit may act as the battery heating circuit 700. A voltage sensor 34 measures the state of charge of the battery unit and communicates this to a power control system, not shown. A temperature sensor 36 measures the temperature of the battery unit, by measuring the temperature of one of the terminals, the positive or the negative terminal. As described herein, a lithium battery cannot be effectively charged if the temperature is below a threshold charge value and cannot be effectively discharged if the temperature is below threshold discharge value. A controller 65 of the battery monitoring module, such as a microprocessor 67 may receive input from the temperature sensor(s) and then control a heating device and a balancing circuit or discharge circuit 72 to provide a flow of current to heat a heating device 75. The heating device 75, such as a resistor 73 or transistor, is in thermal communication with one of the terminals of the battery unit and is heated if the temperature of the battery unit, as measured by the temperature sensor 36 or 37, measures a temperature below at least one of the threshold values, such as a lower temperature threshold value. The heating device may receive a flow of current from the discharge circuit 72 to heat the heating device 75 and thereby heat the electrode connected to the heated terminal, the positive terminal 28 as shown. The heat is transferred into the battery housing 38 by the electrode, wherein it heats the battery from the interior of the housing, or internally. The heat flow is depicted by the bold arrows. As shown in FIG. 24, the positive electrode 58 is heated and heat is transferred from the positive electrode through the separator 56 to the negative electrode 59, as indicated by the bold arrows. The heat is then transferred to the negative terminal 29 where the temperature is measured by the temperature sensor 36. Temperature sensor 36 is coupled with the negative terminal and as the negative electrode 59 rises in temperature, the negative terminal also rises in temperature until it is above at least one of threshold temperature values, such as an upper temperature threshold value. The upper temperature threshold value may be greater than the lower temperature threshold value, to prevent the heating circuit from turning on and off too frequently. The battery monitoring module 30 may then reduce or eliminate the current flow to the discharge circuit and to the heating device.

As shown in FIG. 25, the battery unit 20 comprises a plurality of positive electrodes 58, negative electrodes 59 and separators 56 that are stacked within the housing 38 to form a single cell 31 having a plurality of cell units 33. A cell unit 33 consists of a positive electrode, a negative electrode and a separator therebetween. The cell shown has five positive electrodes and some of these electrodes act as the positive electrode for two cell units, wherein there is a separate and negative electrode on either side of the positive electrode. This single positive electrode for two opposing negative electrodes is a dual cell unit 39. Likewise, some of the negative electrodes act as a negative electrode for positive electrodes configured on either side. The positive and negative electrodes may be planar sheets of material comprising a metal conductor, such as aluminum or copper. The metal conductor may act as heating device to conduct and transfer heat into the cell to heat the cell above a threshold temperature. A positive electrode connector 55 connects the positive electrodes 58, to provide electrical current to each of the individual positive electrodes. The heating device 75 is coupled with the positive electrode 75 and heat is transferred into the battery housing 38 by the positive electrode. Heat may also be transferred by a positive electrode connector. Alternatively, the heating device may be coupled with the negative terminal, or negative electrode connector 57 to enable heat transfer into the housing by the negative electrode. The electrodes may heat the electrolyte 77 and heat may be distributed within the housing by the electrolyte. A heating device is thermally coupled with a terminal of the battery when it heats the terminal directly or through a terminal connector, whereby when the heating device is on, the terminal will increase in temperature. A heating device may conduct heat through a thermally conductive material that may be non-electrically conductive. For example, a thermally coupled heating device may employ a material such as silicone rubbers or epoxies comprising boron nitride or aluminum nitride. The material, such as an elastomer may be filled with boron nitride or aluminum nitride to produce a thermally conductive yet electrically non-conductive heating material. An enclosure may be configured around the heating device and the terminal or terminal conductor to heat the terminal through conduction or convection.

Figure 26:
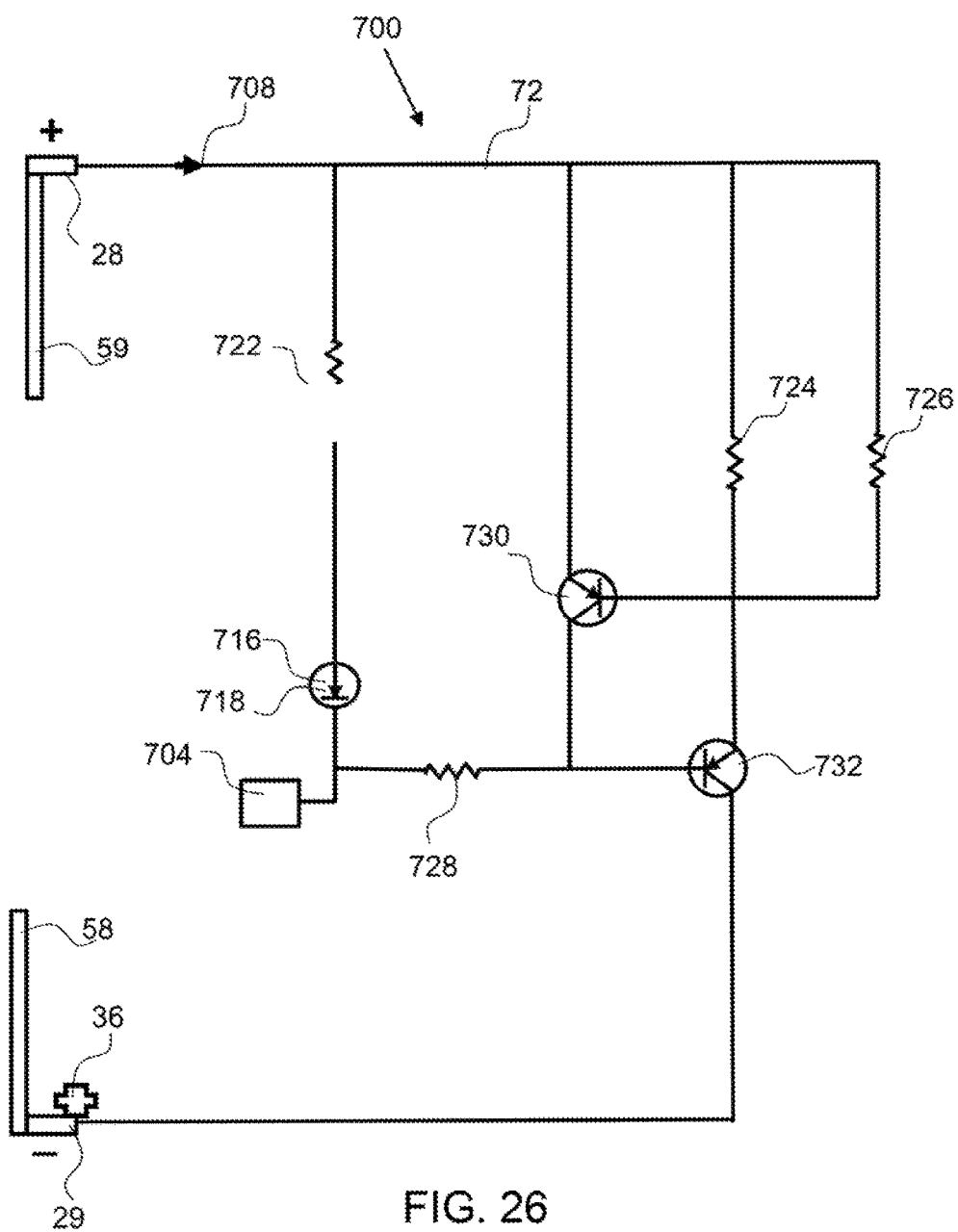
FIG. 26 shows a diagram of a battery heating circuit that provides a flow of current to the heating device.

As shown in FIG. 26, a battery heating circuit 700, which may be a battery discharge circuit 72, produces a flow of current 708 for heating a terminal, positive terminal 28 or negative terminal 29, and subsequently an associated electrode of the battery. When a temperature sensor 36 detects that the battery has dropped below a lower threshold temperature value, the controller 704 may activate the battery heating circuit. The heater may be coupled with a terminal connector as described herein. A terminal connector may extend between a terminal and the electrode and be electrically and thermally conductive. When the battery heating circuit is turned on, electrical current from a terminal of the battery will flow through resistor 722 and indicator 716, such as a light emitting diode (LED) 718, causing the LED to illuminate to indicate that the heater is activated. Concurrently, electrical current will flow through resistor 724, 726 and transistor 732. The voltage developed across resistor 724 and 726 will cause the transistor 730 to partially turn on, starving transistor 732 for base current. As the current through resistors 724 and 726 increases, transistor 730 will starve more current from the base of transistor 732. An equilibrium between the two transistors 730 and 732 will be reached so that the current through 732 will be constant even though the battery cell voltage may change. Transistor 732 will be operating in a linear mode in the normal voltage operating range of the battery cell and will dissipate heat. By locating the heat dissipating transistor near a terminal of the battery cell, this heat will be transferred to from the terminal to an electrode that extends into the inner core of the battery cell to warm the battery internally. A software program in the controller, or a microprocessor of the controller, will determine when to turn the heater on and off. In particular, when the temperature sensor measures a temperature that is above an upper threshold limit, the controller will deactivate or turn-off the battery heating circuit by opening the transistors 730 and 732. The control system may turn on the battery heating circuit when a temperature sensor measures a temperature of the battery that is below a lower threshold temperature value or limit and in some cases only when the state of charge of the battery is above a threshold value to prevent discharging the battery and further reducing the battery voltage. In addition, as the battery heating circuit may be turned-off by the controller if while activated, the voltage of the battery drops below a lower threshold value; again, to prevent further reduction of the battery voltage by a draw of current to the heater. In still another embodiment, the battery heater may have a time limit, wherein the battery heater is activated for a period of time and then shuts off. A battery heater circuit may have a user override, or a means to prevent the battery heater from being activated, such as a manual switch, or a selection that is input to the controller, such as through a user interface.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An integral battery heating system comprising:
    a) a battery controller;
    b) a battery unit comprising a plurality of battery cells, said battery unit comprising:
        i) a battery housing;
        ii) a positive terminal;
        iii) a negative terminal;
        iv) a positive electrode electrically coupled with the positive terminal and extending into the battery housing;
        v) a negative electrode electrically coupled with the negative terminal and extending into the battery housing;
        vi) a separator between the positive and negative electrodes; and
        vii) electrolyte within the housing;
    c) wherein each of the plurality of cells comprises a battery temperature control system comprising:
        i) a battery temperature sensor directly coupled to first terminal of each of the plurality of battery cells that measures a temperature of a first terminal, one of said positive or negative terminals and communicates the temperature of the first terminal to the battery controller;
        ii) a heating device directly coupled to and in contact with a second terminal of each of the battery cells, wherein the second terminal is the other of the positive or negative terminals;
        iii) a discharge circuit that provides a current flow to the heating device to heat the second terminal;
        wherein when the temperature of the first terminal drops below a lower threshold temperature value the battery control system initiates current flow from the discharge circuit to the heating device to heat the heating device and the second terminal; and
        wherein when the temperature of the first terminal rises above an upper threshold temperature value, the battery controller stops the current flow to the discharge circuit.

2. The integral battery heating system of claim 1, wherein the battery is a lithium battery.

3. The integral battery heating system of claim 2, wherein the lower threshold temperature value is less than 10° C.

4. The integral battery heating system of claim 2, wherein the upper threshold temperature value is greater than 10° C.

5. The integral battery heating system of claim 1, wherein the second terminal is the negative terminal and the second electrode is the negative electrode and wherein heat from the negative terminal flows to the negative electrode through the separator and into the positive electrode to heat the positive electrode.

6. The integral battery heating system of claim 1, wherein the second terminal is the positive terminal and the second electrode is the positive electrode and wherein heat from the positive terminal flows to the positive electrode through the separator and into the negative electrode to heat the negative electrode.

7. The integral battery heating system of claim 1, wherein the battery comprises a plurality of cell units each comprising a separator between a positive electrode and a negative electrode.

8. The integral battery heating system of claim 1, wherein the battery comprises a plurality of dual cell units, wherein a single positive electrode is configured between two opposing separators and negative electrodes.

9. The integral battery heating system of claim 1, wherein the heating device is attached to an electrode connector that extends between and electrically couples the terminal to the electrode.

10. The integral battery heating system of claim 1, wherein the heating device is an electrically resistive heater.

11. The integral battery heating system of claim 1, wherein the discharge circuit comprises a first transistors and a second transistor and a plurality of resistors.

12. The integral battery heating system of claim 11, wherein the discharge circuit creates an equilibrium between the first and second transistors to produce a constant current through the first transistor.

13. The integral battery heating system of claim 11, wherein the heating device comprises at least one of the first or second transistor of the discharge circuit.

14. The integral battery heating system of claim 11, wherein the heating device comprises at least one of the plurality of resistors of the discharge circuit.

15. The integral battery heating system of claim 1, further comprising a battery unit monitoring module that is electrically connected to the positive terminal and the negative terminal of the battery and measures a state of charge of the battery.

16. The integral battery heating system of claim 15, wherein the battery unit monitoring module comprises:
    a) an input data request port connected to an output data request port of a computing device of a battery management system; and
    b) an output data request port;
    c) an output data port connected to the input data port of the computing device.

17. The integral battery heating system of claim 1, further comprising a battery management system comprising:
    a) a computing device comprising:
        i) an output data request port; and
        ii) an input data port
    b) wherein each of the cells comprises a battery unit monitoring module;
        wherein a first battery unit monitoring module is coupled with a first battery unit and comprises:
        i) an input data request port connected to the output data request port or the computing device; and
        ii) an output data request port;
    c) an output data port connected to the input data port of the computing device; and d) a second battery unit monitoring module coupled with a second battery unit and comprising:
  i) a single input data request port connected only to the output data request port of the first battery unit monitoring module, therein defining a module connection between said first battery unit monitoring module and said second battery unit monitoring module;
  ii) an output data port connected to the input data port of the computing device;
wherein the first battery unit monitoring is a master to said second battery unit monitoring module and the second battery unit monitoring module is a slave to the first battery unit monitoring module;
wherein the first battery unit monitoring module responds to a data request signal from the output data request port of the computing device by transmitting data of the first battery unit to the input data port of the computing device and subsequently transmits a data request to the second battery unit monitoring module through said module connection; and
wherein the second battery unit monitoring module responds to the data request from the output data request port the first battery unit monitoring module by transmitting data of the second battery unit to the input data port of the computing device;
wherein the computing device receives data from the first and second battery unit monitoring modules sequentially after sending a single data request signal to only the first battery unit monitoring module; and
wherein the computing device receives data from the second battery unit monitoring module automatically after receiving data from the first battery unit monitoring module.

18. An integral battery heating system comprising:
a) a battery controller;
b) a lithium ion battery unit comprising a plurality of battery cells, said lithium ion battery unit comprising:
  i) a battery housing;
  ii) a positive terminal;
  iii) a negative terminal;
  iv) a positive electrode electrically coupled with the positive terminal and extending into the battery housing;
  v) a negative electrode electrically coupled with the negative terminal and extending into the battery housing;
  vi) a separator between the positive and negative electrodes; and
  vii) electrolyte within the housing;
c) wherein each of the plurality of cells comprises a battery temperature control system comprising:
  i) a battery temperature sensor directly coupled to first terminal of each of the plurality of battery cells that measures a temperature of a first terminal, one of said positive or negative terminals and communicates the temperature of the first terminal to the battery controller;
  ii) a heating device directly coupled to and in contact with a second terminal of each of the battery cells, wherein the second terminal is the other of the positive or negative terminals;
  iii) a discharge circuit that provides a current flow to the heating device to heat the second terminal;
  wherein when the temperature of the first terminal drops below a lower temperature threshold value the battery control system initiates current flow from the discharge circuit to the heating device to heat the heating device and the second terminal;
  wherein when the temperature of the first terminal rises above an upper temperature threshold value, the battery controller stops the current flow to the discharge circuit; and
  wherein the battery comprises a plurality of dual cell units, wherein a single positive electrode is configured between two opposing separators and negative electrodes;
d) a battery unit monitoring module that is electrically connected to the positive terminal and the negative terminal of the battery and measures a state of charge of the battery and comprising a battery balancing circuit comprising said discharge circuit.

19. The integral battery heating system of claim 18, wherein the battery unit monitoring module comprises:
a) an input data request port connected to an output data request port of a computing device of a battery management system; and
b) an output data request port;
  an output data port connected to the input data port of the computing device.

20. The integral battery heating system of claim 17, wherein the discharge circuit of the battery temperature control system is also a discharge circuit of the battery monitoring module.

* * * * *